United States Patent
Akashika et al.

(10) Patent No.: US 7,058,804 B1
(45) Date of Patent: Jun. 6, 2006

(54) DATA STORING SYSTEM, ISSUING APPARATUS, DATA PROVIDING APPARATUS AND COMPUTER READABLE MEDIUM STORING DATA STORING PROGRAM

(75) Inventors: Hideki Akashika, Koutou-ku (JP); Shinichi Hirata, Zushi (JP); Nagaaki Ohyama, Kawasaki (JP); Akio Kokubu, Minato-ku (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1035 days.

(21) Appl. No.: 09/650,323

(22) Filed: Aug. 29, 2000

(30) Foreign Application Priority Data

Aug. 30, 1999 (JP) .......................................... 11-243564

(51) Int. Cl.
*H04L 9/00* (2006.01)
*G06K 19/06* (2006.01)

(52) U.S. Cl. ........................ 713/156; 713/157; 713/175; 713/176; 713/172; 713/173; 235/492; 235/376; 705/44

(58) Field of Classification Search ................ 713/156, 713/157, 175, 176, 172, 173; 235/492, 376; 705/44
See application file for complete search history.

(56) References Cited

FOREIGN PATENT DOCUMENTS

WO    WO 00/08611    2/2000

OTHER PUBLICATIONS

"Contermporary Encryption Theory", Ikeno, Koyama, IEICE.
Next generational IC card system study group, "NICS–Framework basic concept", Mar. 2000 pp. 1–66.
VISA, "Open Platform, Overview", Feb. 2000, pp. 1–29.
MAOSCO, "Overview of the MULTOS Environment" 1997, pp. 1–11.

*Primary Examiner*—Emmanuel L. Moise
*Assistant Examiner*—Shin-Hon Chen
(74) *Attorney, Agent, or Firm*—Kenyon & Kenyon

(57) ABSTRACT

A data storing system is provided, wherein the data storing system includes: a user apparatus; an issuing apparatus which issues a registration certificate; a data providing apparatus; an issuer registration apparatus; and a data registration apparatus; wherein the user apparatus includes: a part which generates registration information on a key including a user public key, sends the registration information to the issuing apparatus with user information; and a part which verifies a registration certificate, received from the issuing apparatus, which is signature information of the issuer for the registration information and the user information, stores the registration certificate to a storage device when the registration certificate is verified; wherein the issuing apparatus includes a part which generates the registration certificate and sends the registration certificate to the user apparatus.

14 Claims, 16 Drawing Sheets

F I G. 8
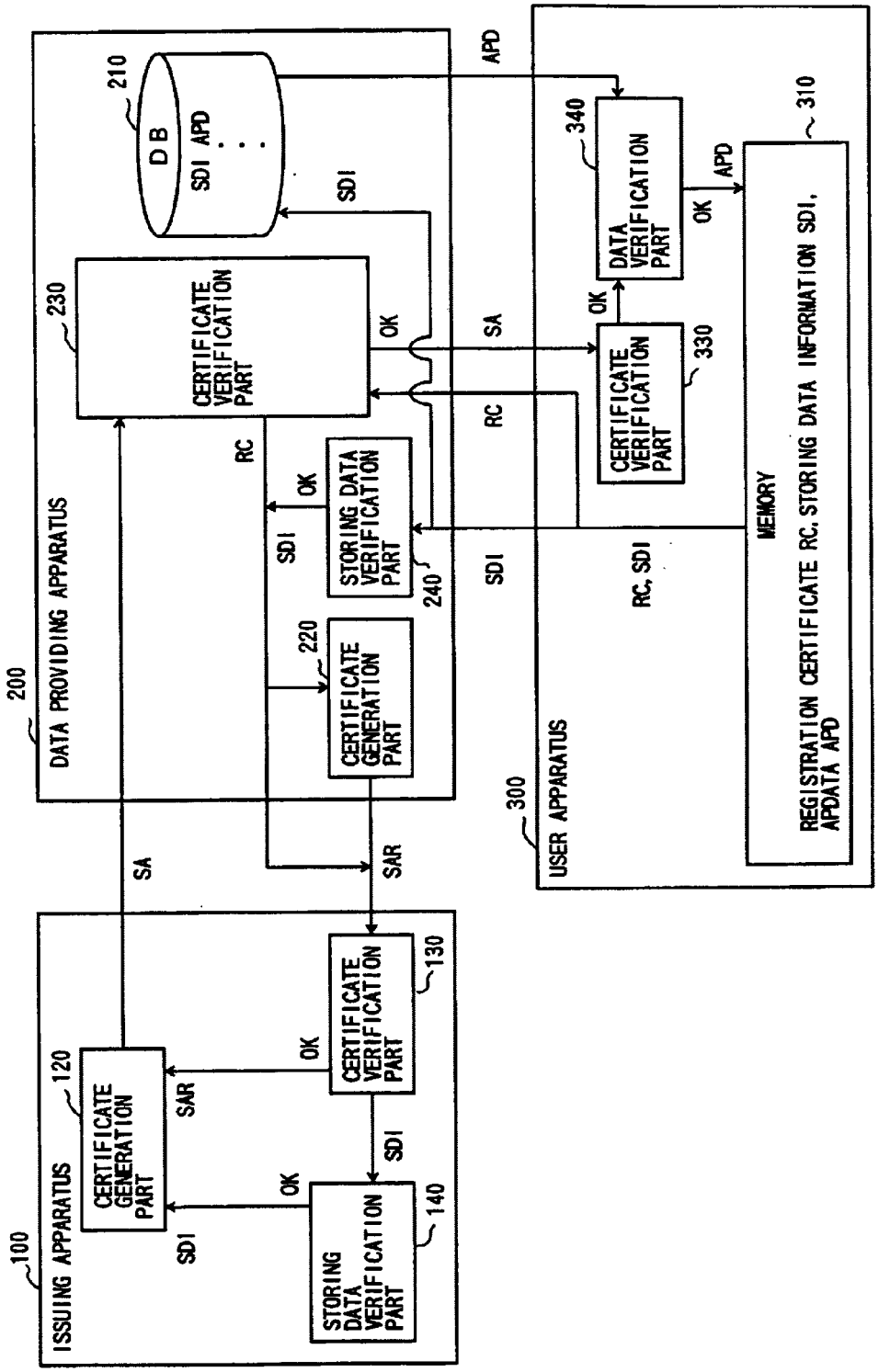

DATA STORING SYSTEM, ISSUING APPARATUS, DATA PROVIDING APPARATUS AND COMPUTER READABLE MEDIUM STORING DATA STORING PROGRAM

BACKGROUND OF THE INVENTION

1. Field of the Invention

The present invention relates to a data storing system,, an apparatus and a computer readable medium storing a data storing program. More particularly, the present invention relates to a data storing system, an apparatus and a computer readable medium storing a data storing program for storing data such as a program into an IC card and the like by using a telecommunication system and the like.

2. Description of the Related Art

Recently, a data storing system which uses an apparatus having a high level of security such as an IC card is becoming popular. An issuer (an IC card issuer) stores an important data such as a program in the apparatus when the issuer issues the apparatus.

MULTOS is an example of a conventional system wherein a system, called MULTOS-CA, which guarantees data has authority to store a program to a user apparatus (for example, an IC card) for retaining security, and the issuer (IC card issuer) in MULTOS stores the program in the user apparatus. Therefor, there are problems that a data provider (a service provider) which provides a program can not let a user store the program which the data provider provides, and that the data provider can not manage information on storing a program.

In addition, there is no means for knowing that a valid issuer and a valid data provider acknowledges user's operation in which the user adds, changes, deletes data. Thus, there is a problem that data can not be stored in a user apparatus safely via network and the like.

Therefore, a data provider can store data only in a card which is issued by a specific IC card provider. That is, the data provider can not store data in a card which is issued by an IC card issuer which has no relation to the data provider. Therefore, it is needed that a data provider can store data safely into a card which is issued by any IC card issuer by performing certification with reliability.

SUMMARY OF THE INVENTION

It is, an object of the present invention that the card issuer and the service provider equally can store and delete data in a card safely by mutual agreement between the user, the card issuer and the service provider.

Another object of the present invention is that each of the card issuer and the service provider can obtain information on data which is stored in an IC card.

Another object of the present invention is to register and manage the card issuer, the service provider and the user apparatus such that mutual certification can be performed. That is, the object is that the service provider can store data safely to a user apparatus and an issuer which are not any specific apparatus or issuer.

According to a first aspect of the present invention, the above object of the present invention is achieved by a data storing system comprising:

a user apparatus which stores data;

an issuing apparatus which is held by an issuer that provides the user apparatus, and issues and manages a registration certificate;

a data providing apparatus which is held by a data provider that provides data;

an issuer registration apparatus which is held by an issuer registrar that registers and manages the issuer; and a data registration apparatus which is held by a data registrar that registers and manages the data provider;

wherein the user apparatus comprises:

a registration information generation part which generates registration information on a key including a user public key or a part of a secret key, sends the registration information to the issuing apparatus with user information; and a registration verification part which verifies a registration certificate, received from the issuing apparatus, which is signature information or a hash value of the issuer for the registration in formation and the user information, stores the registration certificate to a storage device when the registration certificate is verified;

wherein the issuing apparatus comprises a registration generation part which generates the registration certificate and sends the registration certificate to the user apparatus.

In the data storing system, the user apparatus may further comprises:

a part which sends the registration certificate and storing data information to the issuing apparatus;

a part which verifies a storing authorization when the storing authorization is received from the issuing apparatus;

a part which verifies that the storing data information corresponds to storing data which is acquired; and a part which stores the storing data into the storage device when it is verified that the storing data information corresponds to the storing data;

the issuing apparatus further comprising:

a part which verifies the registration certificate and the storing data information which are received from the user apparatus;

a part which provides certificate information to the registration certificate and the storing data information for generating a storing authorization request when the registration certificate and the storing data information are verified; and a part which sends the registration certificate, the storing data information and the storing authorization request to the data providing apparatus;

a part which verifies a storing authorization which is received from the data providing apparatus; and a part which sends the storing authorization to the user apparatus when the storing authorization is verified;

the data providing apparatus further comprising:

a part which verifies the storing authorization request;

a part which provides certificate information to the storing authorization request and the storing data information when the storing authorization request is verified for generating a storing authorization, and sends the storing authorization to the issuing apparatus.

According to a second aspect of the present invention, the above object of the present invention is achieved by an issuing apparatus in a data storing system which comprises: a user apparatus which; stores data; the issuing apparatus which is held by an issuer that provides the user apparatus, and issues and manages a registration certificate; a data providing apparatus which is held by a data provider that provides data; an issuer registration apparatus which is held by an issuer registrar that registers and manages the issuer;

and a data registration apparatus which is held by a data registrar that registers and manages the data provider, the issuing apparatus comprising:

a part which receives user information and registration information on a key including a user public key or a part of a secret key from the user apparatus; and a registration generation part which generates registration certificate from the registration information and the user information, and sends the registration certificate to the user apparatus.

According to a third aspect of the present invention, the above object of the present invention is achieved by a data providing apparatus in data storing system which comprises: a user apparatus which stores data; an issuing apparatus which is held by an issuer that provides the user apparatus, and issues and manages a registration certificate; the data providing apparatus which is held by a data provider that provides data; an issuer registration apparatus which is held by an issuer registrar that registers and manages the issuer; and a data registration apparatus which is held by a data registrar that registers and manages the data provider, wherein the user apparatus comprises:

a registration information generation part which generates registration information on a key including a user public key or a part of a secret key, sends the registration information to the issuing apparatus with user information; and a registration verification part which verifies a registration certificate, received from the issuing apparatus, which is signature information or a hash value of the issuer for the registration information and the user information, stores the registration certificate to a storage device when the registration certificate is verified;

wherein the issuing apparatus comprises a registration generation part which generates the registration certificate and sends the registration certificate to the user apparatus, the data providing apparatus comprising:

a part which receives the certificate registration, storing data information and a storing authorization request from the issuing apparatus;

a part which verifies the storing authorization request;

a part which provides certificate information to the storing authorization request and the storing date information when the storing authorization request is verified for generating a storing authorization, and sends the storing authorization to the issuing apparatus.

According to a fourth aspect of the present invention, the above object of the present invention is achieved by a computer readable medium storing program code for causing a data storing system to store data, the data storing system comprising: a user apparatus which stores data; an issuing apparatus which is held by an issuer that provides the user apparatus, and issues and manages a registration Certificate; a data providing apparatus which is held by a data provider that provides data; an issuer registration apparatus which is held by an issuer registrar that registers and manages the issuer; and a data registration apparatus which is held by a data registrar that registers and manages the data provider; the computer readable medium comprising:

registration information generation program code means, provided for the user apparatus, which generates registration information on a key including a user public key or a part of a secret key, sends the registration information to the issuing apparatus with user information; and registration verification program code means, provided for the user apparatus, which verifies a registration certificate, received from the issuing apparatus, which is signature information or a hash value of the issuer for the registration information and the user information, stores the registration certificate to a storage device when the registration certificate is verified;

registration generation program code means, provided for the issuing apparatus, which generates the registration certificate and sends the registration certificate to the user apparatus.

The computer readable medium may further comprises:

program code means, provided for the user apparatus, which sends the registration certificate and storing date information to the issuing apparatus;

program code means, provided for the user apparatus, which verifies a storing authorization when the storing authorization is received from the issuing apparatus;

program code means, provided for the user apparatus, which verifies that the storing data information corresponds to storing data which is acquired; and program code means, provided for the user apparatus, which stores the storing data into the storage device when it is verified that the storing data information corresponds to the storing data;

program code means, provided for the issuing apparatus, which verifies the registration certificate and the storing data information which are received from the user apparatus;

program code means, provided for the issuing apparatus, which provides certificate information to the registration certificate and the storing data information for generating a storing authorization request when the registration certificate and the storing data information are verified; and program code means, provided for the issuing apparatus, which sends the registration certificate, the storing data information and the storing authorization request to the data providing apparatus;

program code means, provided for the issuing apparatus, which verifies a storing authorization which is received from the data providing apparatus; and program code means, provided for the issuing apparatus, which sends the storing authorization to the user apparatus when the storing authorization is verified;

program code means, provided for the data providing apparatus, which verifies the storing authorization request;

program code means, provided for the data providing apparatus, which provides certificate information to the storing authorization request and the storing data information when the storing authorization request is verified for generating a storing authorization, and sends the storing authorization to the issuing apparatus.

According to a fifth aspect of the present invention, the above object of the present invention is achieved by a computer readable medium storing program code for causing an issuing apparatus in a data storing system to perform processes, the data storing system comprising: a user apparatus which stores data; the issuing apparatus which is held by an issuer that provides the user apparatus, and issues and manages a registration certificate; a data providing apparatus which is held by a data provider that provides data; an issuer registration apparatus which is held by an issuer registrar that registers and manages the issuer; and a data registration, apparatus which is held by a data registrar that registers and manages the data provider, the computer readable medium comprising:

program code means which receives user information and registration information on a key including a user public key or a part of a secret key from the user apparatus; and registration generation program code means which generates registration certificate from the registration information and the user information, and sends the registration certificate to the user apparatus.

According to a sixth aspect of the present invention, the above object of the present invention is achieved by a computer readable medium storing program code for causing a data providing apparatus in a data storing system to perform processes, the data storing system comprising: a user apparatus which stores data; an issuing apparatus which is held by an issuer that provides the user apparatus, and issues and manages a registration certificate; the data providing apparatus which is held by a data provider that provides data; an issuer registration apparatus which is held by an issuer registrar that registers and manages the issuer; and a data registration apparatus which is held by a data registrar that registers and manages the data provider, wherein the user apparatus comprises:

registration information generation means which generates registration information on a key including a user public key or a part of a secret key, sends the registration information to the issuing apparatus with user information; and registration verification means which verifies a registration certificate, received from the issuing apparatus, which is signature information or a hash value of the issuer for the registration information and the user information, stores the registration certificate to a storage device when the registration certificate is verified;

wherein the issuing apparatus comprises registration generation means which generates the registration certificate and sends the registration certificate to the user apparatus, the computer readable medium comprising:

program code means which receives the certificate registration, storing data information and a storing authorization request from the issuing apparatus;

program code means which verifies the storing authorization request;

program code means which provides certificate information to the storing authorization request and the storing data information when the storing authorization request is verified for generating a storing authorization, and sends the storing authorization to the issuing apparatus.

As mentioned above, in the present invention, the user apparatus generates the registration information, sends it to the issuing apparatus with user information. The issuing apparatus stores the received registration information and the user information, provides certificate information to the registration information, generates registration certificate, sends it to the user apparatus. The user apparatus verifies the received registration certificate, stores it in a,storage device if it is verified, such that data in an IC card can be stored and deleted safely.

According to the above-mentioned invention, by using the registration certificate which is issued by the registration issuer, the party which receives the registration is insured. In addition, both of the card issuer and the service provider can perform processes such as data storing and data deleting safely.

In addition, the issuing apparatus, the data providing apparatus and the user apparatus X verifies the registration certificate, the storing authorization request and the storing authorization such that tampering by a third party is prevented.

Further, each of the card issuer and the service provider can obtain information on data which is stored an IC card.

BRIEF DESCRIPTION OF THE DRAWINGS

Other objects, features and advantages of the present invention will become more apparent from the following detailed description when read in conjunction with the accompanying drawings, in which:

FIG. 8 is a block diagram of the data storing system when data is stored via the data provider according to the third embodiment;

FIG. 16 is a block diagram of a computer system which can be used as an issuing apparatus, a data providing apparatus and the like.

DETAILED DESCRIPTION OF THE PREFERRED EMBODIMENTS

Figure 1:
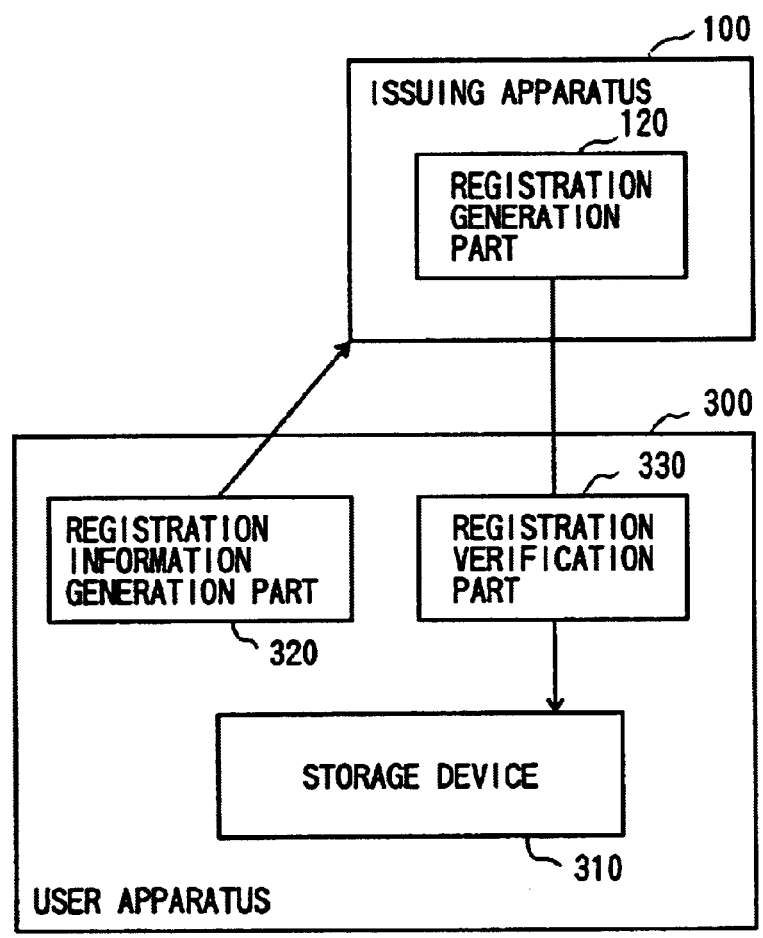
FIG. 1 is a figure showing the principle of the present invention.
Figure 2:
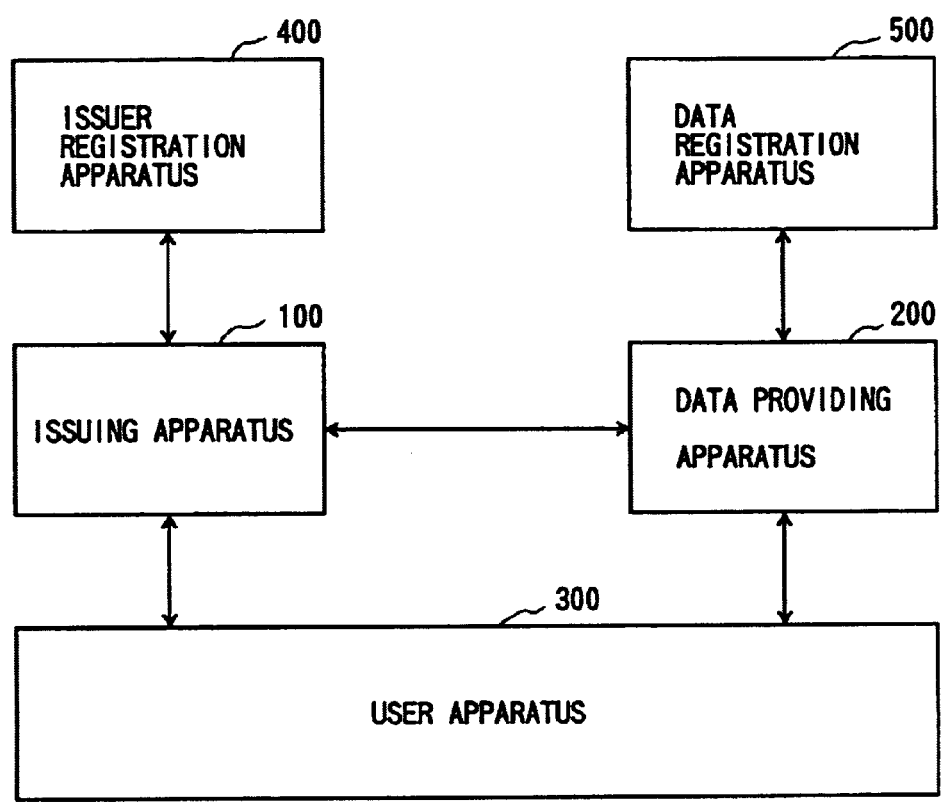
FIG. 2 is a block diagram of a data storing system of the present invention.

FIG. 1 and FIG. 2 are figures of a data storing system for explaining the principle of the present invention. The data storing system includes a user apparatus 300 which stores data; an issuing apparatus 100 which is held by an issuer that provides the user apparatus 300, issues and manages a registration certificate: a data providing apparatus 200 which is held by a data provider that provides data; an issuer registration apparatus 400 which is held by an issuer registrar that registers and manages the issuer; and a data registration apparatus 500 which is held by a data registrar that registers and manages the data provider.

In the above-mentioned configuration, the user apparatus includes a registration information generation part 320 which generates registration information on a key including a user public key or a part of a secret key, sends the registration information to the issuing apparatus 100 with user information; and a registration verification part 330 which verifies a registration certificate which is received from the issuing apparatus and which is signature information or a hash value of the issuer for the registration information and the user information, stores the registration certificate to a storage device 310 when the registration certificate is verified.

The issuing apparatus 100 includes a registration generation part 120 which generates the registration certificate and sends the registration certificate to the user apparatus.

Since the issuer issues the registration certificate to the user apparatus 300, validity of the user apparatus is insured.

As mentioned above, as shown in FIG. 2, the data storing system of the present invention includes an issuing apparatus 100, a data providing apparatus 200, a user apparatus 300, an issuer registration apparatus 400 and a data registration apparatus 500. The issuing apparatus 100 is owned by an issuer which provides the user apparatus, issues and manages a registration certificate. The data providing apparatus 200 is owned by a data provider which provides data. The user apparatus 300 stores the registration certificate and the data. The issuer registration apparatus 400 is owned by an issuer registrar which insures validity of the registration certificate. The data registration apparatus 500 is owned by a data registrar which insures validity of data.

Data can be exchanged between these apparatuses, for example, via communication lines, the Internet and the like. A tamper proof apparatus (an IC card and the like) can be used for these apparatuses.

The issuing apparatus 100, the data providing apparatus 200, the issuer registration apparatus 400 and the data registration apparatus 500 generate and retain key information (such as a public key, a private key, a shared key, a part of a secret key and the like) for generating and verifying a certificate which uses symmetric key cryptography, public key cryptography, digital signature method, secure hash method (message digest) or the like (which can be refereed in "CONTEMPORARY ENCRYPTION THEORY", Ikeno, Koyama, IEICE.

Figure 3:
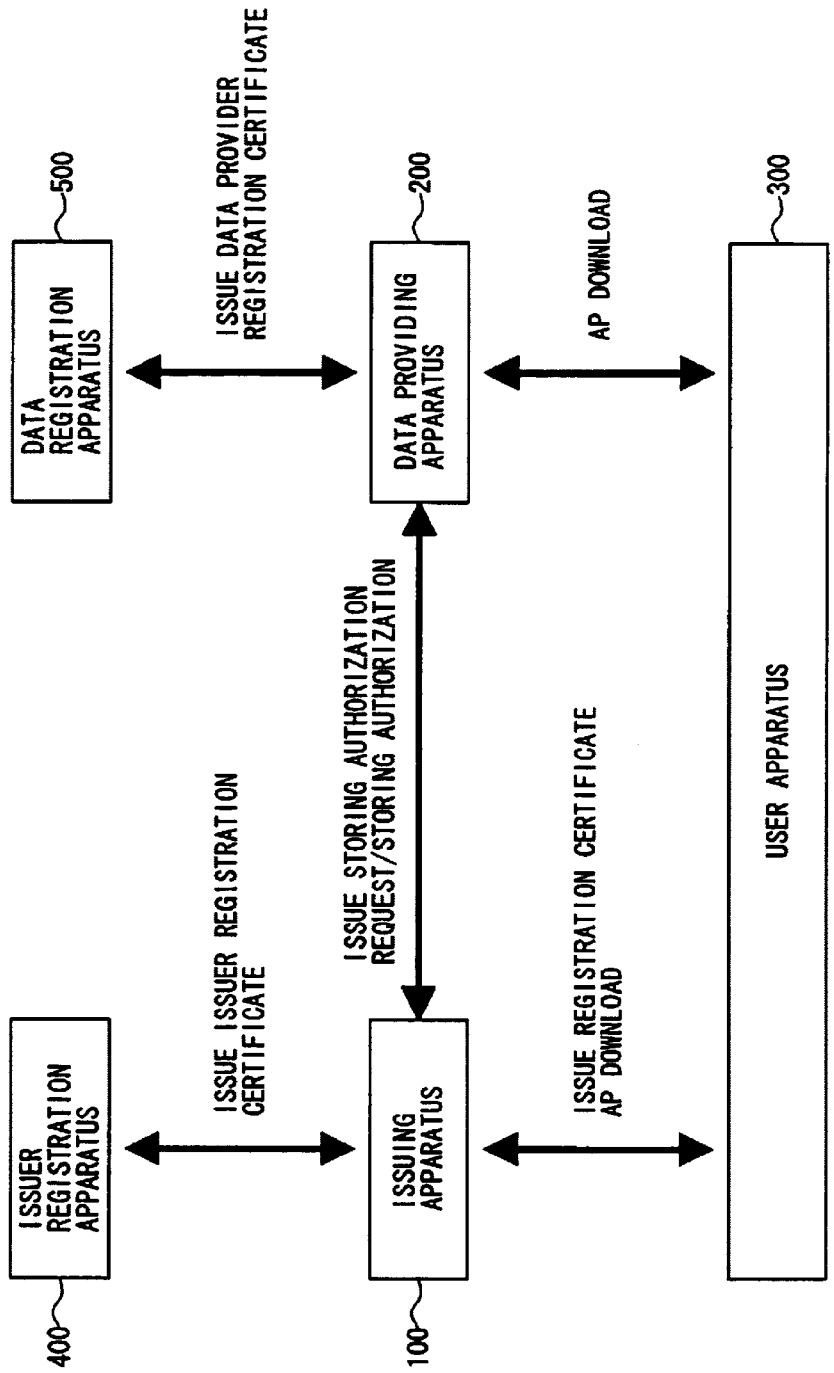
FIG. 3 is a diagram for explaining a general outline of the operation of the data storing system.

In the following, a general outline of the operation of an embodiment of the present invention will be described with reference to FIG. 3. Each of the issuer registration apparatus and the data registration apparatus issues a registration certificate for the issuing apparatus and the data providing apparatus respectively by using a signature or the like. According to the registration certificate, each of the issuing apparatus and the data providing apparatus can be proved to be valid.

The issuing apparatus issues a registration certificate to the user apparatus. An application can be downloaded into the user apparatus via the issuing apparatus or via the data providing apparatus. An authorization for storing data is exchanged between the issuing apparatus and the data providing apparatus.

In the following, embodiments of the present invention will be described with reference to figures.

(First Embodiment)

A first embodiment will be described with reference to FIG. 4. In this embodiment, the process of user registration between the user apparatus 300 and the issuing, apparatus 100 will be described.

Figure 4:
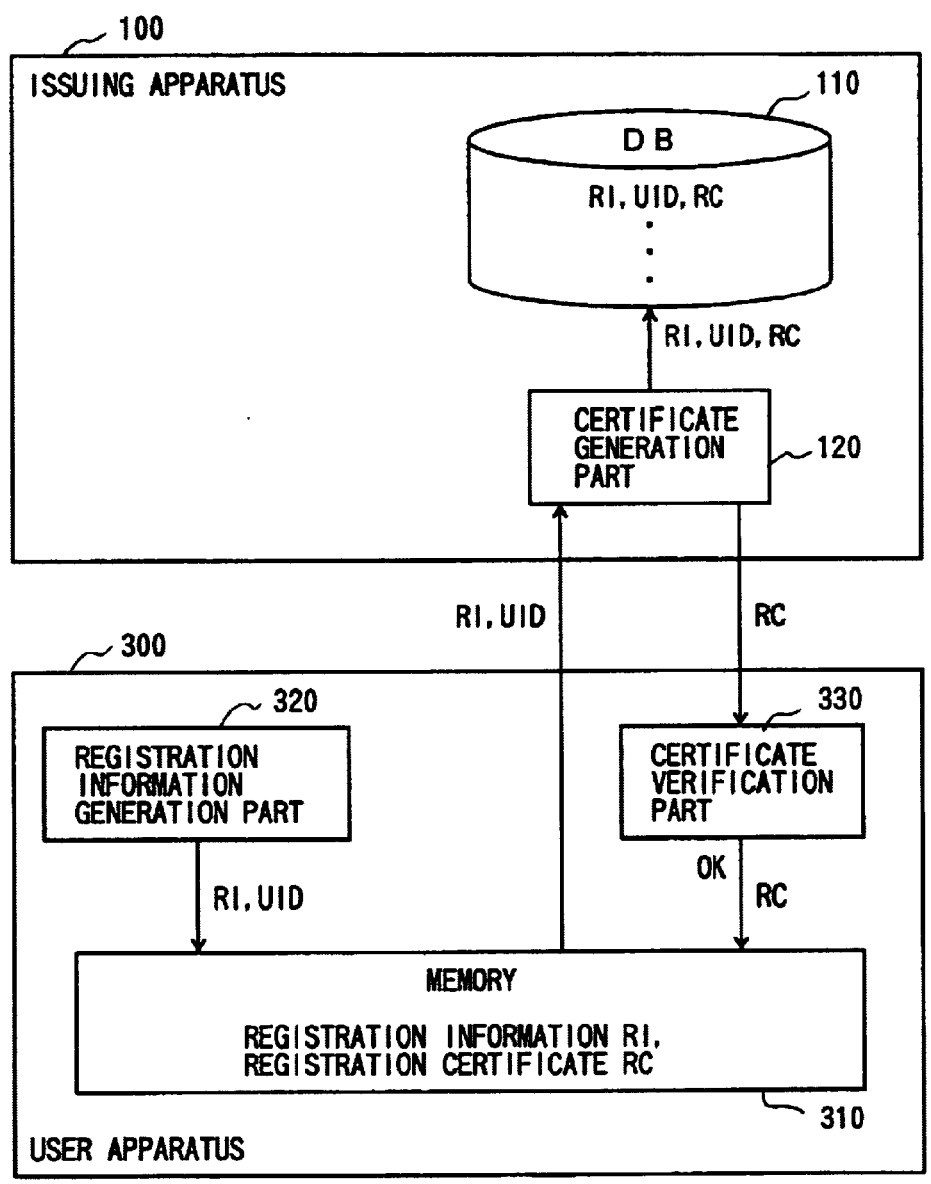
FIG. 4 shows a system configuration for user registration according to a first embodiment of the present invention.

FIG. 4 shows a system configuration for user registration of the first embodiment. This system includes the issuing apparatus 100 and the user apparatus 300. The issuing apparatus 100 includes a database 110 and a certificate generation part 120. The certificate generation part 120 generates a digital signature (or encrypted data, or secure hash) for proving that the issuer generates a registration certificate from input data. As the input data, information (RI) on a key such as a user public key (public key, symmetric key in symmetric key cryptography or the like) and user information (UID) which includes a user identifier are input from the user apparatus 300. The certificate generation part 120 generates the digital signature (or encrypted data, or secure hash) of the issuer for the registration information (RI) and the user information (UID) which are input from the user apparatus 300. The registration generation part 120 outputs these data to the user apparatus 300 as a registration certificate (RC). In the above configuration, the issuing apparatus 100 may generate the registration information (RI) and the user information (UI) instead of receiving them from the user apparatus 300. In such a case, the issuing apparatus 100 includes a registration information generation part.

The user apparatus 300 includes a memory 310, a registration information generation part 320 and a certificate verification part 330.

The registration information generation part 320 generates the registration information (RI) and the user information (UID), and stores these information into the memory 310.

The certificate verification part 330 verifies validity of the registration certificate (RC) input from the issuing apparatus 100. The certificate verification part 330 verifies the digital signature (or encrypted data, or secure hash) of the registration certificate (RC). When the registration certificate is valid, the certificate verification part 330 stores the registration certificate (RC) into the memory 310.

The operation of user registration is as follows.

(Step 11) The registration information generation part 320 in the user apparatus 300 generates the registration information for the issuing apparatus 100, stores the registration information (RI) into the memory 310, and sends the registration information (RI) to the issuing apparatus 100. When the issuing apparatus issues the registration information, this step 11 is not performed.

(Step 12) The certificate generation part 120 in the issuing apparatus 100 generates a registration certificate (RC) from the registration information (RI), stores it in the database 110, and sends it to the user apparatus 300.

(Step 13) The certificate verification part 330 in the user apparatus 300 verifies the registration certificate (RC), and stores the registration certificate (RC) in the memory 310 if it is verified.

(Second Embodiment)

Figure 5:
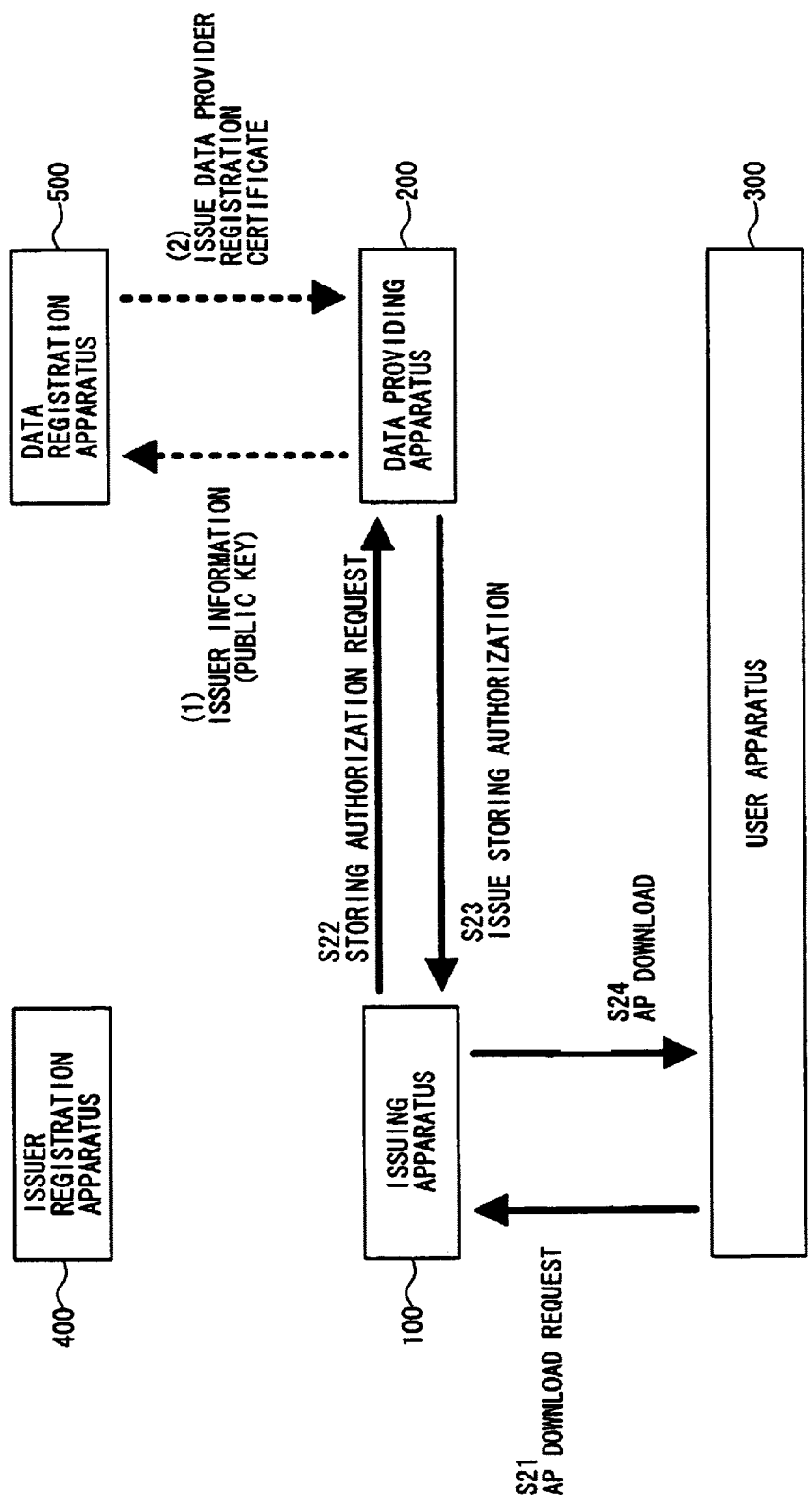
FIG. 5 is a diagram for explaining a general outline of the operation of the data storing system when data is stored via an issuer according to a second embodiment.

In this embodiment, the process of storing data (downloading of application) via the issuer will be described. First, the general outline will be described with reference to FIG. 5.

In this process, the data registration apparatus 500 issues a data provider registration certificate to a data providing apparatus 200 in advance. (the processes (1) and (2) in FIG. 5.

When the user apparatus 300 requests application download to the issuing apparatus 100 in step 21, the issuing apparatus 100 sends a storing authorization request to the data providing apparatus 200 in step 22. The data providing apparatus 200 issues a storing authorization to the issuing apparatus 100 in step 23. Then, the issuing apparatus 100 downloads a requested application to the user apparatus 100 in step 24.

Figure 6:
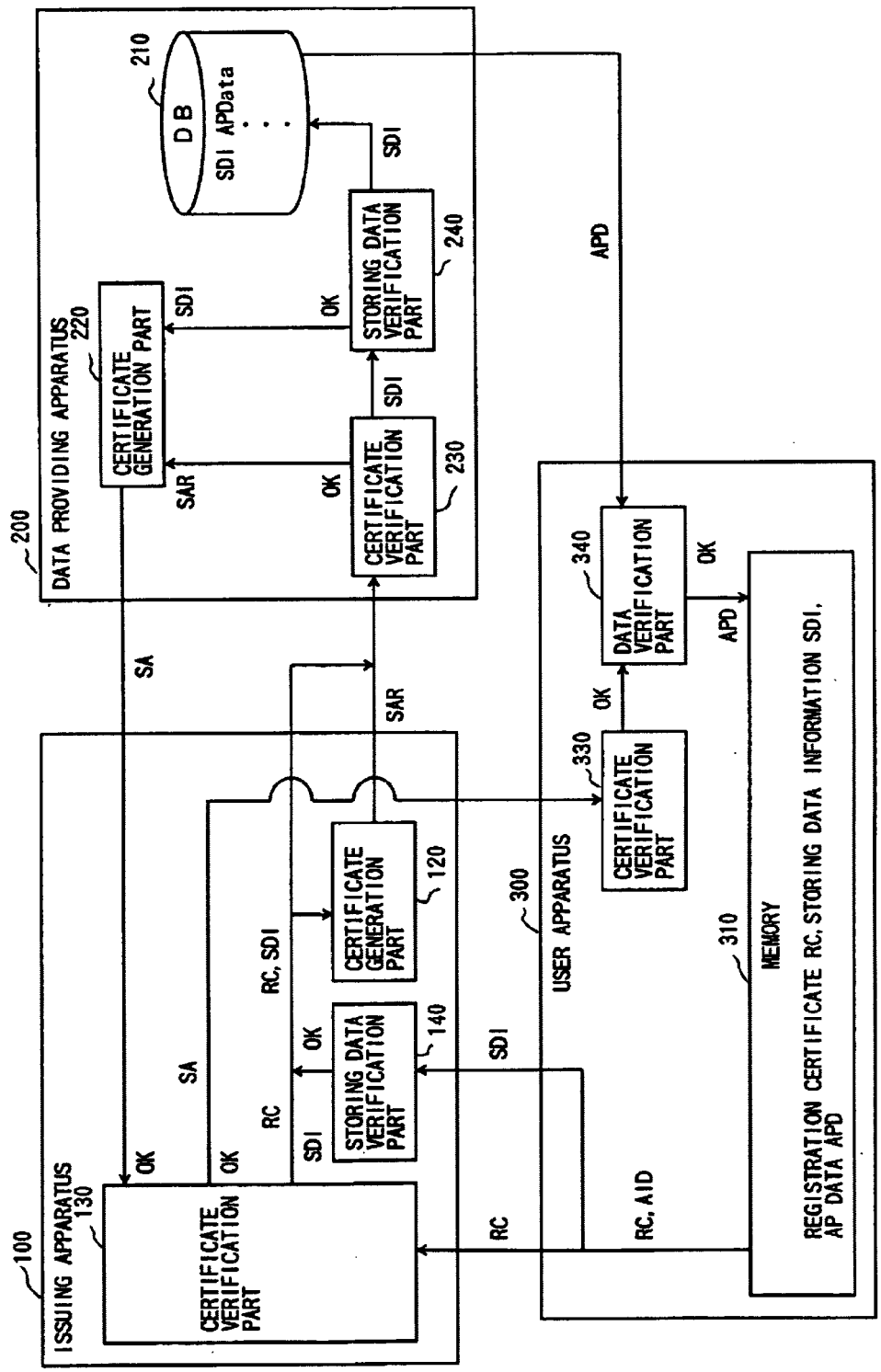
FIG. 6 is a block diagram of the data storing system when data is stored via the issuer according to the second embodiment.

Next, the second embodiment will be described in detail with reference to FIG. 6. FIG. 6 is a block diagram of the data storing system for data storing via the issuer according to the second embodiment.

This system shown in FIG. 6 includes a issuing apparatus 100, a data providing apparatus 200 and a user apparatus 300.

The issuing apparatus 100 includes a certificate generation part 120, a certificate verification part 130 and a storing data verification part 140.

The certificate verification part 130 acquires a registration certificate (RC) from the user apparatus 300 and verifies the digital signature (or encrypted data, or secure hash) for proving that the registration certificate (RC) is generated by the issuing apparatus 100. When the registration certificate is verified, a storing authorization is issued, and sent to the user apparatus 300.

The storing data verification part 140 acquires storing data information (SDI) which includes storing data identifier from the user apparatus 300. Then, the storing data verification part 140 verifies the storing data information (SDI). When the data is verified, the verification result (storing data information (SDI)) is sent to the certificate generation part 120 and the data providing apparatus 200.

The certificate generation part 120 receives verified a registration certificate (RC) from the certificate verification part 130 and receives verified storing data information (SDI) from the storing data verification part 140. Then, the certificate generation part 120 generates a digital signature (or encrypted data, or secure hash) for the registration certificate and the storing data information, and sends the digital signature as a storing authorization request (SAR) to the data providing apparatus 200.

The data providing apparatus 200 includes a database 210, a certificate generation part 220, a certificate verification part 230 and a storing data verification part 240.

When the certificate verification part 230 acquires the storing authorization request (SAR) from the issuing apparatus, the certificate verification part 230 verifies the storing authorization request. When it is verified, the certificate verification part 230 sends the storing data information (SDI) to the storing data verification part 240 and sends the storing authorization request (SAR) to the certificate generation part 220.

The storing data verification part 240 writes the storing data information (SDI) which is received from the certificate verification part 230 into the database 210. In addition, the storing data verification part 240 verifies the storing data information (SDI). When it is verified, the storing data information (SDI) is sent to the certificate generation part 220.

The certificate generation part 220 verifies the storing authorization request (SAR) received from the certificate verification part 230 and verifies the storing data information (SDI) receives from the storing data verification part 240. When they are verified, storing authorization (SA) is sent to the issuing apparatus 100.

The user apparatus 300 includes a memory 310, a certificate verification part 330 and a data verification part 340.

The certificate verification part 330 acquires the storing authorization (SA) from the issuing apparatus 100, verifies it, and sends the verification result to the data verification part 340.

When the storing authorization (SA) is verified in the certificate verification part 330, the data verification part 340 acquires storing data (APD) from the data providing apparatus 210, and writes the storing data (APD) into the memory 310.

In the following, the operation of the above-mentioned configuration in which data is stored via the issuer will be described in detail.

(Step 21) The user apparatus 300 sends the registration certificate (RC) and the storing data information (SDI) to the issuing apparatus 100.

(Step 22) The issuing apparatus 100 verifies the registration certificate (RC) in the certificate verification part 130, and verifies the storing data information (SDI) in the storing data verification part 140. When both of them are verified, the issuing apparatus 100 generates the storing authorization request (SAR) in the certificate generation part 120, and sends the registration certificate (RC), the storing data (SDI) and the storing authorization request (SAR) to the data providing apparatus 200.

(Step: 23) The data providing apparatus 200 verifies the storing authorization request (SAR) in the certificate verification part 230, and verifies the storing data information (SDI). When both of them are verified, the data providing apparatus 200 generates a storing authorization (SA) for the storing authorization request (SAR) and the storing data information (SDI) in the certificate generation part 220, and sends the storing authorization (SA) to the issuing apparatus 100.

(Step 24) The issuing apparatus 100 verifies the storing authorization (SA) in the certificate verification part 130. When it is verified, the issuing apparatus sends, the storing authorization (SA) to the user apparatus 300.

Then, the user apparatus 300 verifies the storing authorization (SA) by using the certificate verification part 330. The user apparatus 300 verifies that the storing data information (SDI) corresponds to storing data (APD) which is received in some way by using the data verification part 340. When it is verified, the storing data (APD) is stored in the memory 310.

In the above-mentioned process, the user apparatus can delete the storing data (APD) which is already in the memory 310.

(Third Embodiment)

Figure 7:
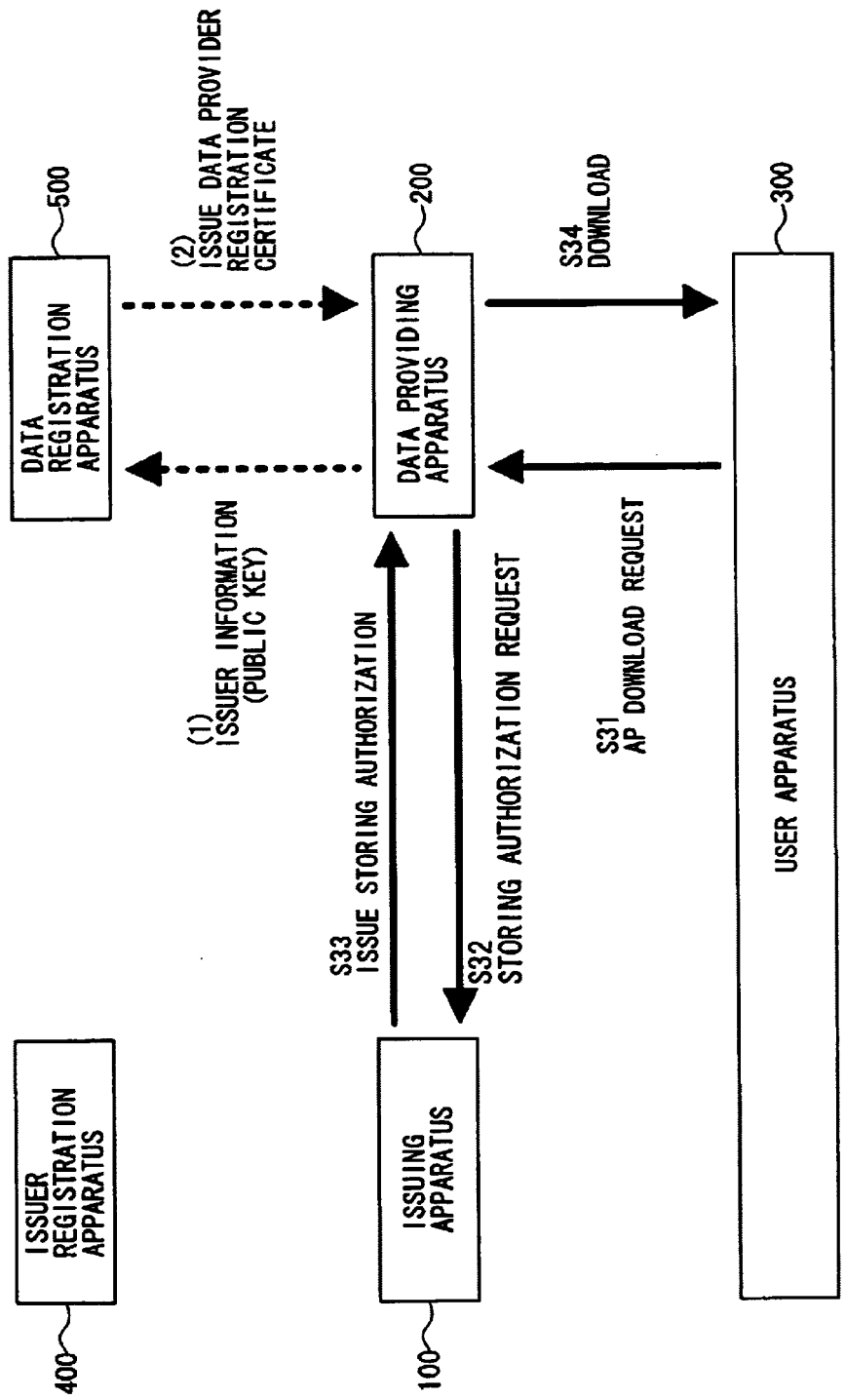
FIG. 7 is a diagram for explaining a general outline of the operation of the data storing system when data is stored via an data provider according to a third embodiment.

In the third embodiment, a case wherein data is stored via the data provider. The general outline will be described with reference to FIG. 7.

In this embodiment, the data registration apparatus 500 issues a data provider registration certificate to e data providing apparatus 200 in advance. (the processes (1) and (2) in FIG. 7.)

When the user apparatus 300 requests application download to the data providing apparatus 200 in step 31, the data providing apparatus 200 sends a storing authorization request to the issuing apparatus 100 in step 32. The issuing apparatus 100 issues a storing authorization to the data providing apparatus 200 in step 33. Then, the data providing apparatus 200 downloads a requested application to the user apparatus 100 in step 34.

Next, the third embodiment will be described in detail with reference to FIG. 8. FIG. 8 is a block diagram of the data storing system for data storing via the data provider according to the third embodiment.

This system shown in FIG. 8 includes a issuing apparatus 100, a data providing apparatus 200 and a user apparatus 300.

The issuing apparatus 100 includes a certificate generation part 120, a certificate verification part 130 and a storing data verification part 140.

When the certificate verification part 130 acquires the storing authorization request (SAR) from the data providing apparatus 200, the certificate verification part 130 verifies the storing authorization request. When it is verified, the certificate verification part 130 sends the storing data information (SDI) to the storing data verification part 140 and sends the storing authorization request (SAR) to the certificate generation part 120.

The storing data verification part 140 verifies the storing data information (SDI). When it is verified, the storing data information (SDI) is sent to the certificate generation part 120.

The certificate generation part 120 sends a digital signature (or encrypted data, or secure hash) as the storing authorization (SA) to the data proving apparatus 200. The digital signature proves that the storing authorization (SA) is generated by the issuer on the basis of the storing authorization request (SAR) received from the certificate verification part 130 and the storing data information (SDI) received from the storing data verification part 140.

The data providing apparatus 200 includes a database 210, a certificate generation part 220, a certificate verification part 230 and a storing data verification part 240.

The certificate verification part 230 acquires the storing authorization (SA) from the issuing apparatus 100 and acquires a registration certificate (RC) from the user apparatus 300, and verifies them.

The certificate generation part 220 receives the registration certificate (RC) from the certificate verification part 230 and receives the storing data information (SDI) from the storing data verification part 240. Then, the certificate generation part 220 generates a storing authorization request (SAR) from them, and sends the storing authorization request (SAR) to the issuing apparatus 100.

The storing data verification part 240 acquires storing data information (SDI) from the user apparatus 300. Then, the storing data verification part 240 verifies the storing data information (SDI). When it is verified, the verification result (storing data information (SDI)) is sent to the certificate generation part 220.

The user apparatus 300 includes a memory 310, a certificate verification part 330 and a data verification part 340.

The registration certificate (RC) is sent to the certificate verification part 230 of the data providing apparatus 200 from the memory 310, and the storing data information (SDI) is sent to the storing data verification part 240 of the data providing apparatus 200.

The certificate verification part 330 acquires the storing authorization (SA) from the certificate verification part 230 in the data providing apparatus 230, verifies the storing authorization (SA), and sends the verification result to the data verification part 340 when the storing authorization (SA) is verified.

The data verification part 340 acquires storing data (APD) from the database 210 in the data providing apparatus 200, and verifies the data. When it is verified, the data verification part 340 stores the storing data (APD) into the memory 310.

In the following, the operation of the above-mentioned configuration in which data is stored via the provider will be described in detail.

(Step 31) The user apparatus 300 sends the registration certificate (RC) and the storing data information (SDI) to the data providing apparatus 200.

(Step 32) The data providing apparatus 200 verifies the registration certificate (RC) in the certificate verification part 230, and verifies the storing data information (SDI) in the storing data verification part 240. When both of them are verified, the data providing apparatus 200 generates the storing authorization request (SAR) based on the registration certificate (RC) and the storing data (SDI) in the certificate generation part 220, and sends the registration certificate (RC), the storing data (SDI) and the storing authorization request (SAR) to the issuing apparatus 200.

(Step 33) The issuing apparatus 100 verifies the storing authorization request (SAR) in the certificate verification part 130, and verifies the storing data information (SDI) in the storing data verification part 140. When both of them are verified, the issuing apparatus 100 generates a storing authorization (SA) for the storing authorization request (SAR) and the storing data information (SDI) in the certificate generation part 120, and sends the storing authorization (SA) to the data providing apparatus 100.

(Step 34) The data providing apparatus 200 verifies the storing authorization (SA) in the certificate verification part 230. When it is verified, the data providing apparatus 200 sends the storing authorization (SA) to the user apparatus 300.

Then, the user apparatus 300 verifies the storing authorization (SA) by using the certificate verification part 330. The user apparatus 300 verifies that the storing data information (SDI) corresponds to storing data (APD) which is received in some way by using the data verification part 340. When it is verified, the storing data (APD) is stored in the memory 310.

In the above-mentioned process, the user apparatus 300 can delete the storing data (APD) which is already in the memory 310 instead of storing the storing data (APD).

(Fourth Embodiment)

Figure 9:
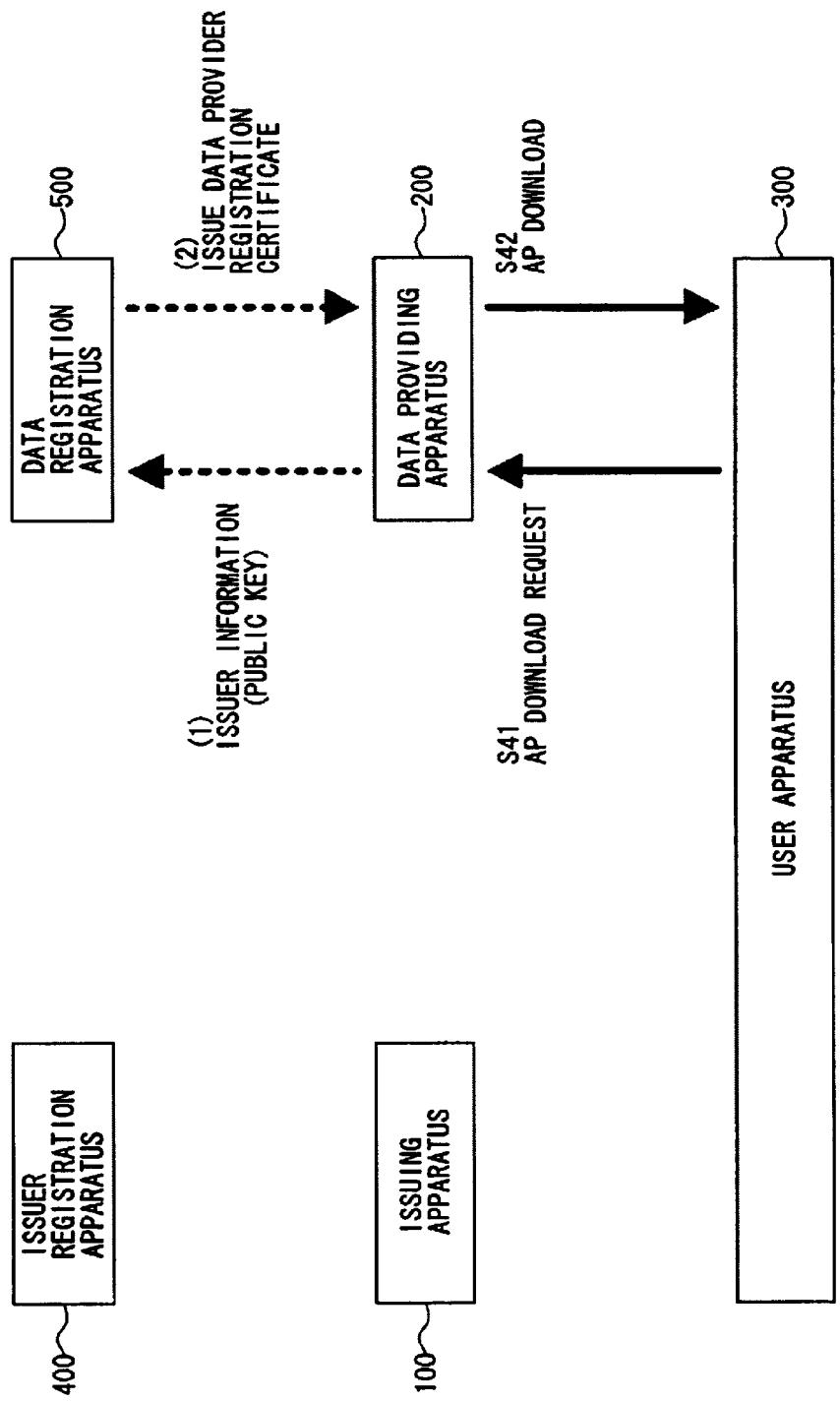
FIG. 9 is a diagram for explaining a general outline of the operation of the data storing system when data is stored only by the data provider according to a fourth embodiment.

In this embodiment, data storing process only by the data provider will be described. The general outline will be described with reference to FIG. 9. In this embodiment, authorization by the card issuer may not be necessary for data download.

In this embodiment, the data registration apparatus 500 issues a data provider registration certificate to the data providing apparatus 200 in advance. (the processes (1) and (2) in FIG. 9.)

When the user apparatus 300 requests application download to the data providing apparatus 200 in step 41, the data providing apparatus 200 downloads a requested application to the user apparatus 300 in step 42.

Figure 10:
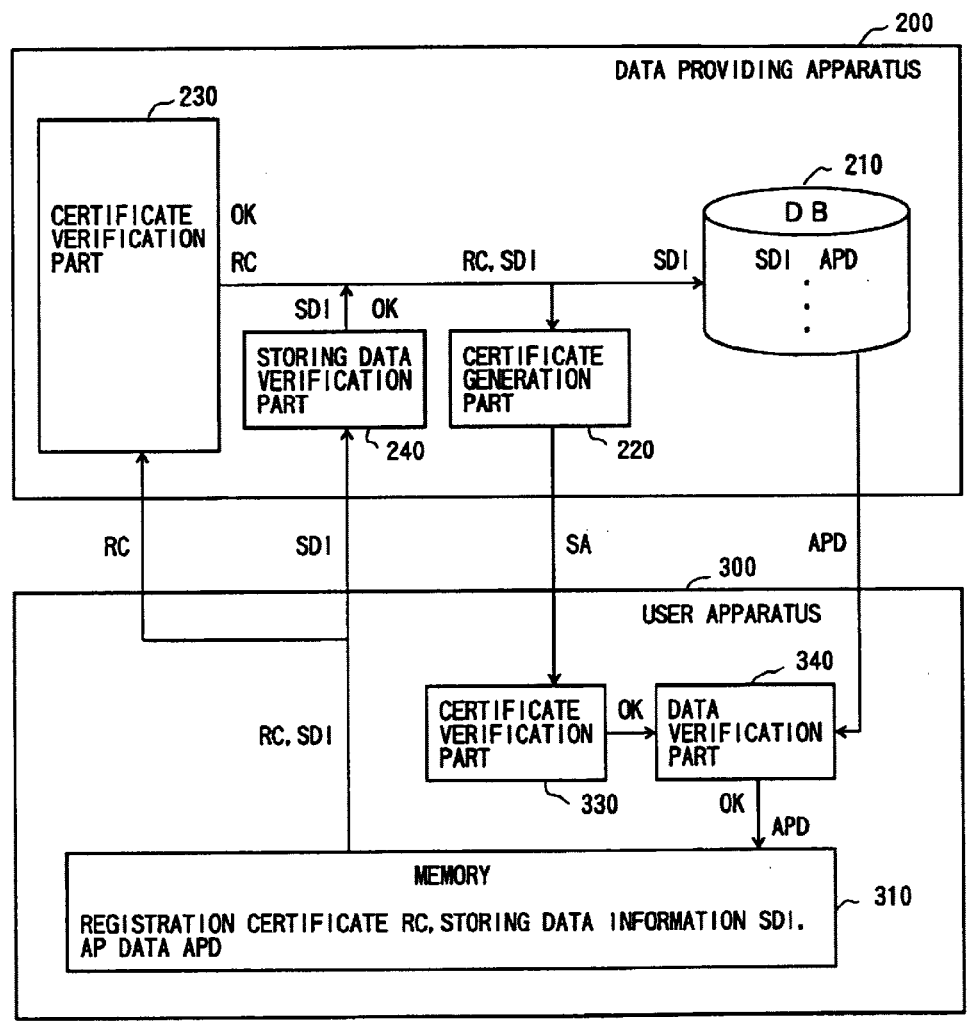
FIG. 10 is a block diagram of the data storing system when data is stored only by the data provider according to the fourth embodiment.

Next, the fourth embodiment will be described in detail with reference to FIG. 10. FIG. 10 is a block diagram of the data storing system for data storing only by the data provider according to the fourth embodiment.

This system shown in FIG. 10 includes a data providing apparatus 200 and a user apparatus 300.

The data providing apparatus 200 includes a database 210, a certificate generation part 220, a certificate verification part 230 and a storing data verification part 240.

The certificate verification part 230 acquires a registration certificate (RC) from the user apparatus 300, and verifies it.

The certificate generation part 220 verifies both of the registration certificate (RC) the storing data information (SDI). When they are verified, the certificate generation part 220 generates a storing authorization request (SAR) from them, and sends the storing authorization request (SAR) to the user apparatus 300.

The user apparatus 300 includes a memory 310, a certificate verification part 330 and a data verification part 340.

The certificate verification part 330 acquires the storing authorization (SA) received from the data providing apparatus 200, and verifies the storing authorization (SA).

The data verification part 340 acquires storing data (APD) from the data providing apparatus 200, and verifies the data. When it is verified, the data verification part 340 stores the storing data (APD) into the memory 310.

In the following, the operation of the above-mentioned configuration in which data is stored only by the data provider will be described in detail.

(Step 41) The user apparatus 300 sends the registration certificate (RC) and the storing data information (SD) to the data providing apparatus 200.

(Step 42) The data providing apparatus 200 verifies the registration certificate (RC) in the certificate verification part 230. When it is verified, the data providing apparatus 200 generates the storing authorization (RC) based on the storing data information (SDI) in the certificate generation part 220, and sends the storing authorization (RC) to the user apparatus 300.

Then, the user apparatus 300 verifies the storing authorization (SA) by using the certificate verification part 330. The user apparatus 300 verifies that the storing data information (SDI) corresponds to storing data (APD) which is received in some way by using the data verification part 340. When it is verified, the storing data (APD) is stored in the memory 310.

In the above-mentioned process, the user apparatus 300 can delete the storing data (APD) which is already in the memory 310 instead of storing the storing data (APD).

(Fifth Embodiment)

Figure 11:
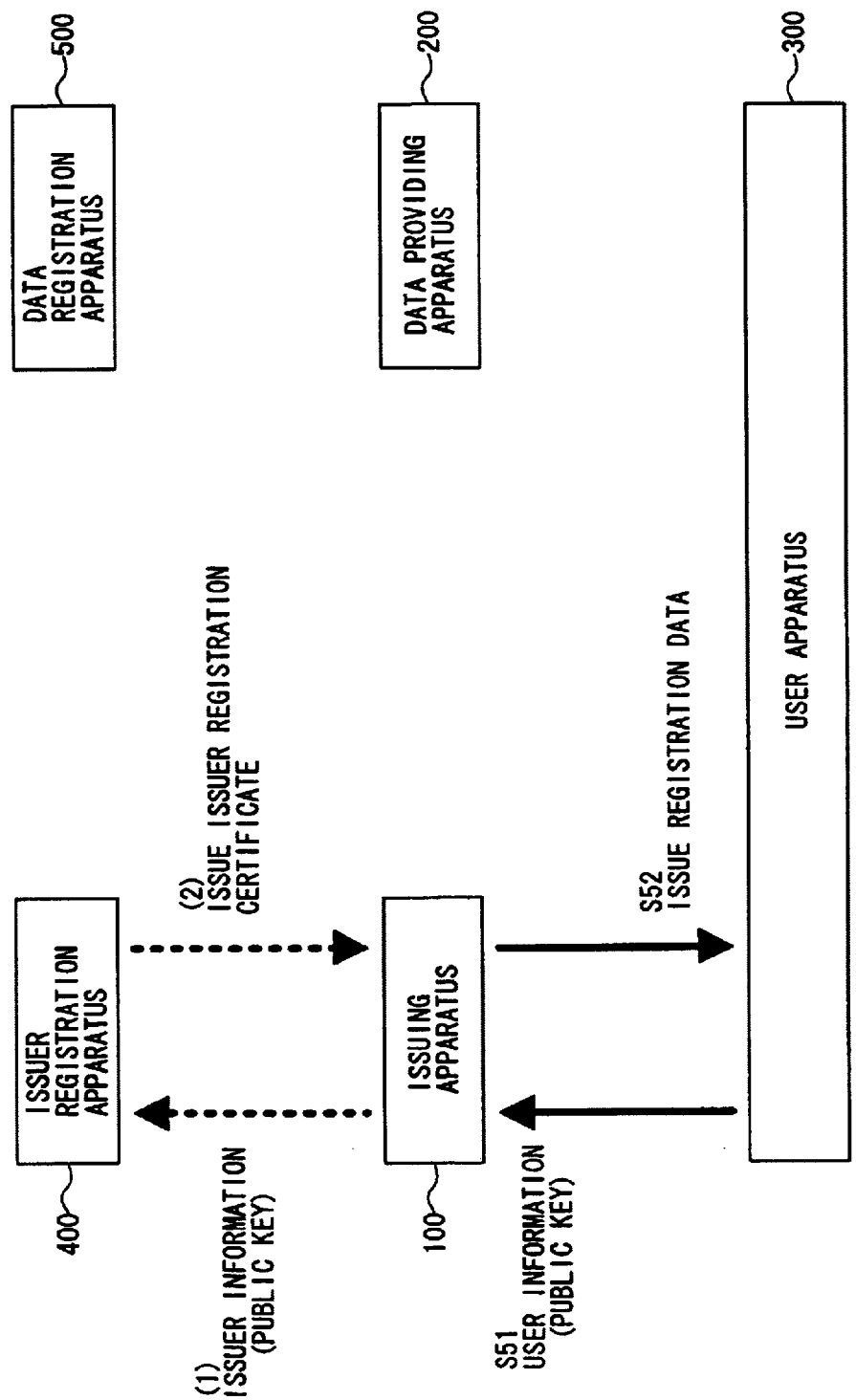
FIG. 11 is a diagram for explaining a general outline of the operation of the data storing system when a user apparatus is registered according to a fifth embodiment.

Next, the fifth embodiment will be described. According to this embodiment, the registration process by the issuing apparatus will be described in detail. The general outline will be described with reference to FIG. 11. In this embodiment, the issuer registration apparatus 400 issues an issuer registration certificate to the issuing apparatus 100 beforehand.

First; the user apparatus sends user information (a public key, a part of a secret key and the like) to the issuing apparatus 100 in step 51. Then, the issuing apparatus 100 generates a registration certificate based on the user information, and sends the registration certificate to the user apparatus in step 52.

The card issuer may generates a registration certificate from the user information and stores the registration certificate in a card which is provided to a user.

Figure 12:
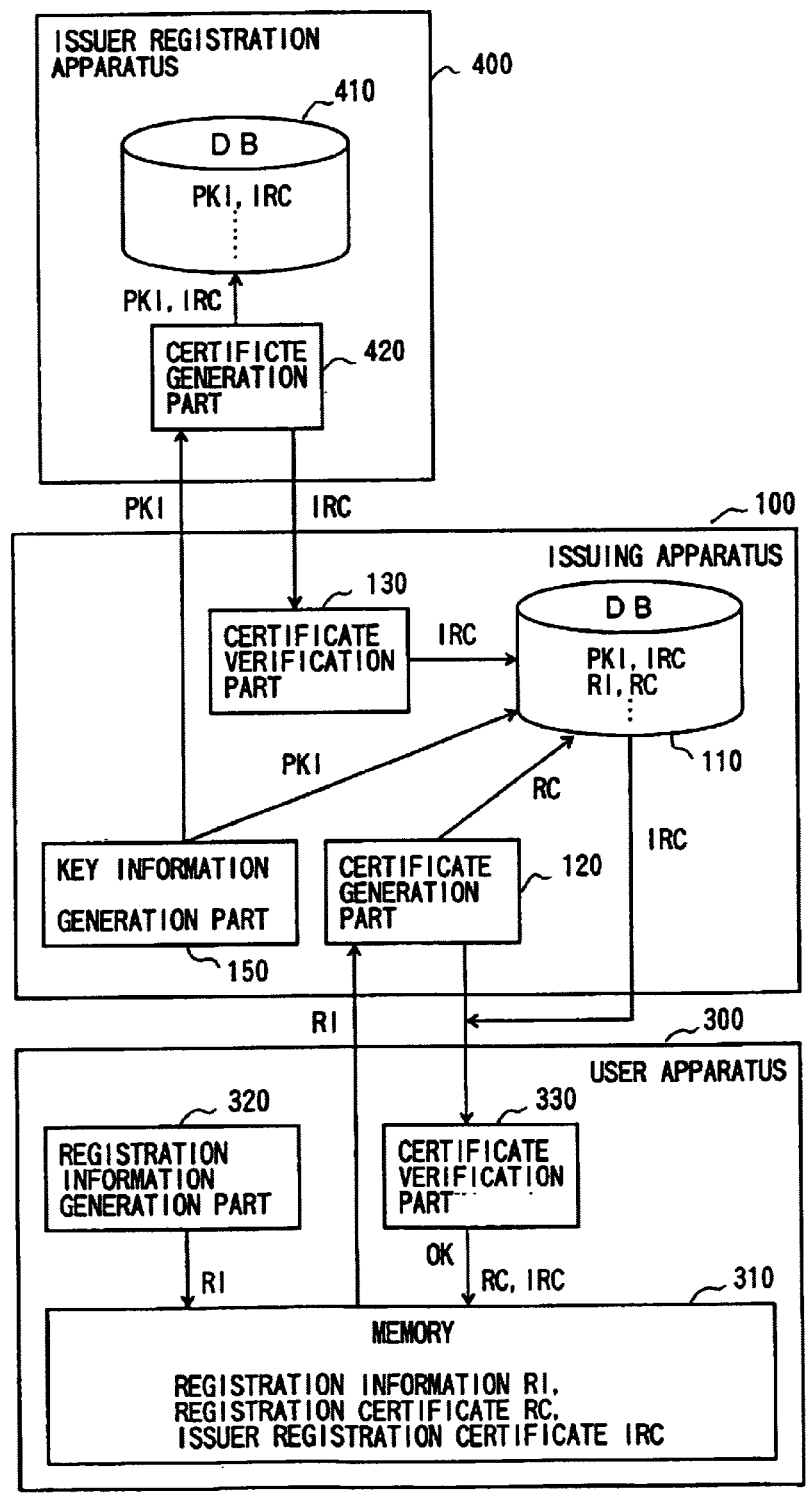
FIG. 12 is a block diagram of the data storing system when a user apparatus is registered according to the fifth embodiment.

Next, the fifth embodiment will be described in detail with reference to FIG. 12. FIG. 12 shows a block diagram of the data storing system at the time of user registration.

This system includes the issuing apparatus 100, the user apparatus 300 and the issuer registration apparatus 400.

The issuer registration apparatus 400 includes a database 410 and a certificate generation part 420.

The certificate generation part 420 acquires information (PKI) used for providing certificate information from the issuing apparatus 100, generates an issuer registration certificate (IRC), stores it into the database 410, and sends it to the issuing apparatus 100.

The issuing apparatus 100 includes a database 110, a certificate generation part 120, a certificate verification part 130 and a key, information generation part 150.

The certificate generation part 120 generates a registration certificate (RC) from registration information (RI) which is received from the user apparatus 300, stores the registration certificate (RC) into the database 110, and sends it to the user apparatus 300.

The certificate verification part 130 acquires the issuer registration certificate (IRC) from the issuer registration apparatus 400, and verifies the issuer registration certificate (IRC). When the issuer registration certificate (IRC) is verified, it is stored into the database 110.

The key information generation part 150 generates information (PKI) which is used for providing certificate information by the issuer.

The issuing apparatus 300 includes a memory 310, a registration information generation part 320 and a certificate verification part 330.

The registration information generation part 320 generates registration information of information (RI) (a public key, a symmetric key in symmetric key cryptography, and the like) on a key such as a user public key or a part of a secret key and stores it in the memory 310.

The certificate verification part 330 acquires the issuer registration certificate (IRC) and the registration certificate (RC) from the issuing apparatus 100 and verifies them. When both of them are verified, they are stored in the memory 110.

In the above configuration, the issuing apparatus 100 may generate the registration information (RI) instead of receiving the registration information (RI) from the issuing apparatus 100. In such a case, the issuing apparatus includes a registration information generation part.

Next, the operation of the above-mentioned configuration for user registration will be described in detail.

(1) The issuing apparatus 100 generates information (key information) used for providing certificate information (used in the certificate generation part 120) by using the key information generation part 150, and sends the information (PKI) (key information, or a part of the key information) to the issuer registration apparatus 400.

(2) Tie issuer registration apparatus 400 generates the issuer registration certificate (IRC) by using the information (PKI) in the certificate generation part 420. Then, the issuer registration apparatus 400 stores the information (PKI) and the issuer registration certificate (IRC), and sends the issuer registration certificate (IRC) to the issuing apparatus 100.

The issuing apparatus 100 verifies the issuer registration certificate (IRC) in the certificate verification part 130. When it is verified, the issuer registration certificate (IRC) is stored in the database 110.

(Step 51) The user apparatus 300 generates registration information (RI) in the registration information generation part 320, stores it in the memory 310 and sends the registration information (RI) to the issuing apparatus 100. As mentioned above, the registration information (RI) can be generated by the issuing apparatus.

(Step 52) The issuing apparatus 100 generates a registration certificate (RC) by using the received registration information (RI) in the certificate generation part 120, stores the registration certificate in to the memory 110, and sends the registration certificate (RC) and the issuer registration certificate (IRC) to the user apparatus 300.

In addition, the user apparatus 300 verifies the registration certificate (RC) and the issuer registration certificate (IRC) by the certificate verification part 330. When both of them are verified, the registration certificate (RC) and the issuer registration certificate (IRC) is stored in the memory 110.

(Sixth Embodiment)

In the following, the general outline of the sixth embodiment will be described with reference to FIG. 13. In this embodiment, a registration is issued to the data providing apparatus and a certificate is provided to application data.

Figure 13:
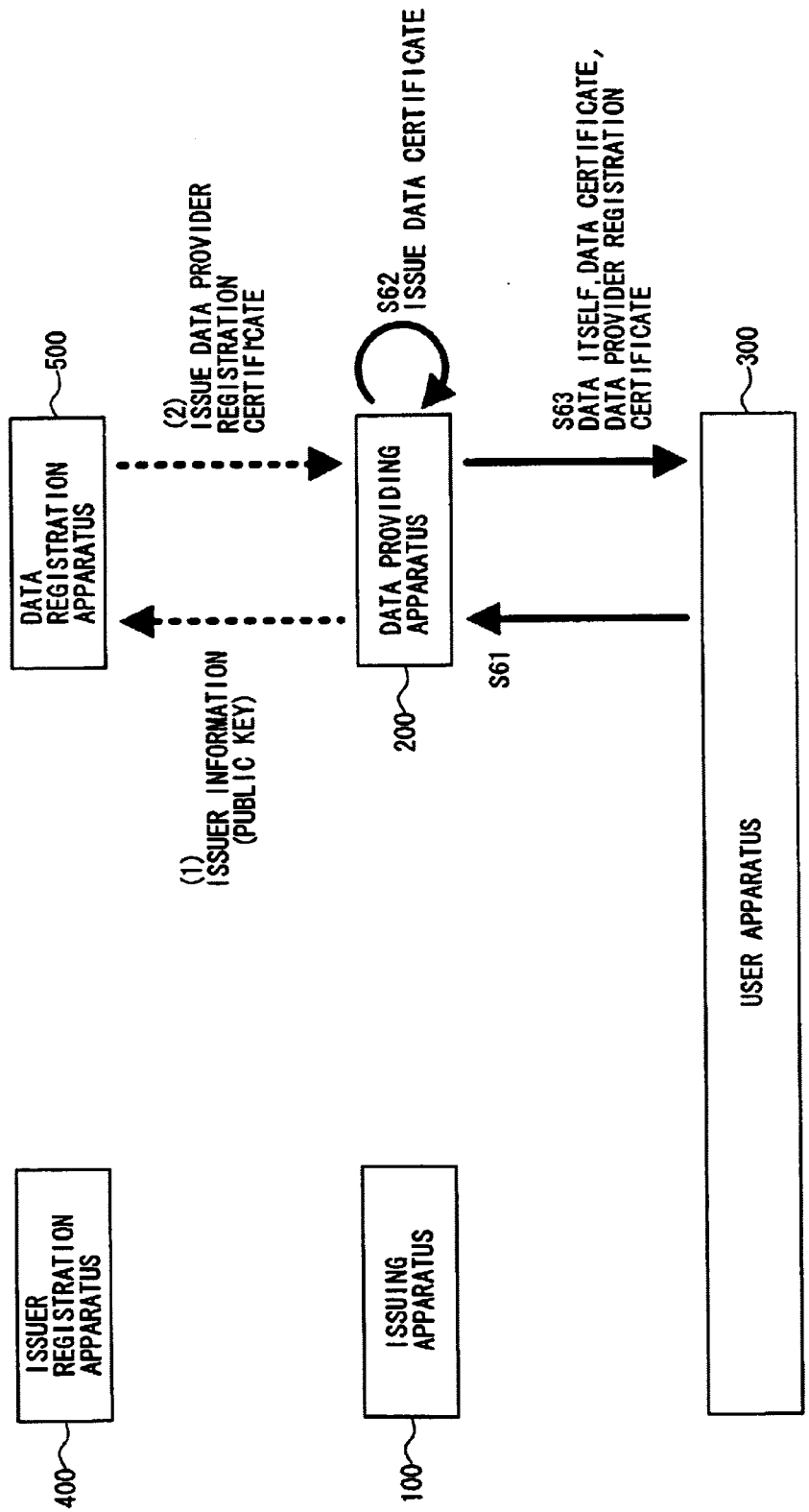
FIG. 13 is a diagram for explaining a general outline of the operation of the data storing system when data is stored according to a sixth embodiment.

As shown in FIG. 13, the data registration apparatus 500 issues a registration to the data providing apparatus beforehand (the process shown in (1) and (2)).

When the user apparatus 300 sends storing data information to the data providing apparatus 200 in step 62, the data providing apparatus 200 issues a certificate of data in step 62. Then, the data providing apparatus 200 sends the data, the certificate and the data provider registration certificate to the user apparatus in step 63.

Figure 14:
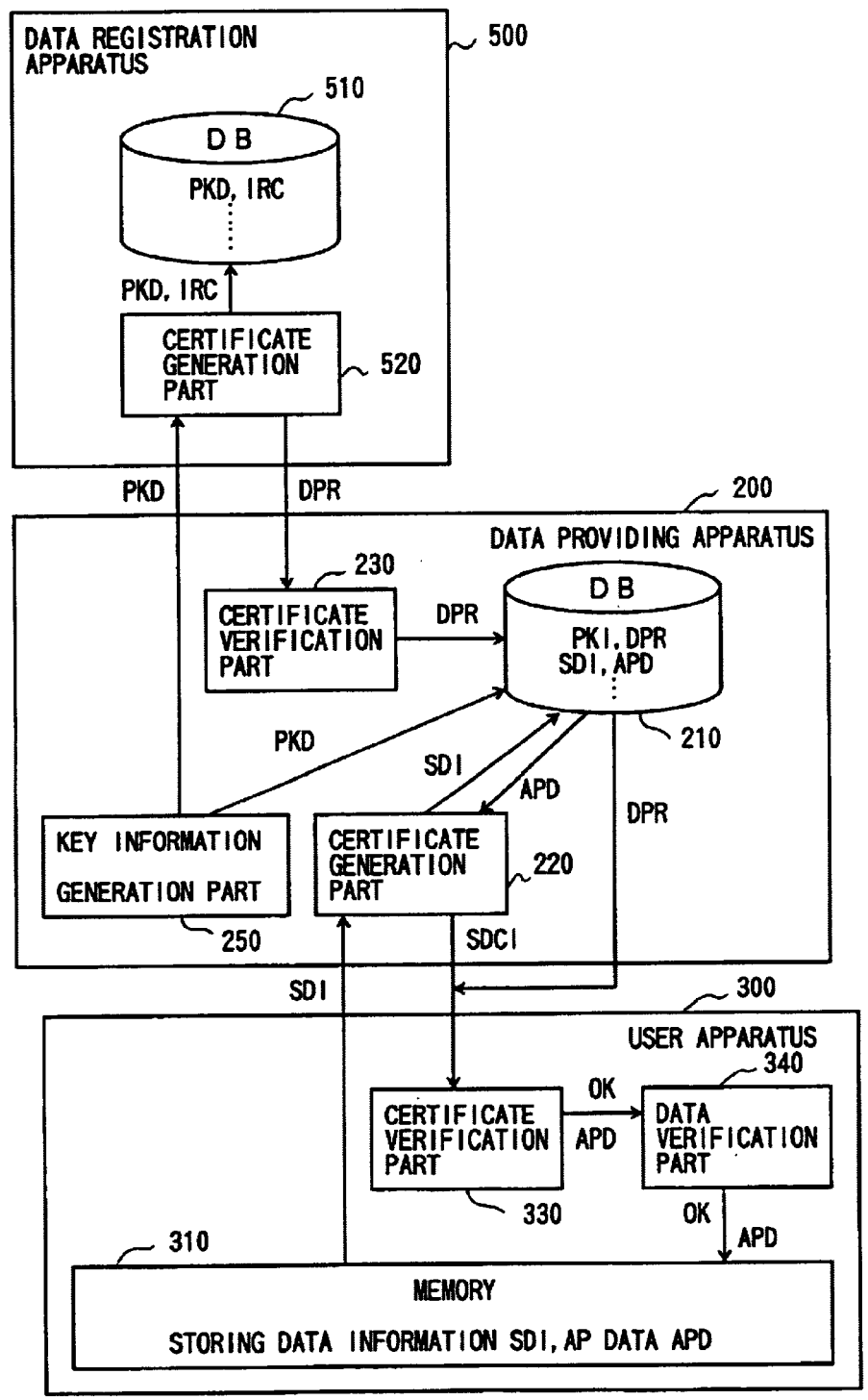
FIG. 14 is a block diagram of the data storing system when data is stored according to the sixth embodiment.

Next, this embodiment will be described in detail with reference to FIG. 14. FIG. 14 shows a block diagram of the data storing system for data storing according to the sixth embodiment.

This system shown in FIG. 14 includes a data providing apparatus 200, the user apparatus 300 and the data registration apparatus 500.

The data registration apparatus 500 includes a database 510 and a certificate generation part 520.

The certificate generation part 520 acquires information (PKD) for providing certificate information by the data provider from the data providing apparatus 200, generates a data provider registration certificate (DPR) which is a digital signature of the data registrar to the information (PKD), stores the data provider registration certificate (DPR) in the database 510 and sends it to the data providing apparatus 200.

The data providing apparatus 200 includes a database 210, a certificate generation part 220, a certificate verification part 230 and a key information generation part 250.

The certificate generation part 220 acquires the storing data information (SDI) from the user apparatus 300 and storing data from the database 210. Then, the certificate generation part 220 generates storing data with a certificate (SDCI) which is the storing data (APD) and a digital signature to the storing data (APD) and the storing data information (SDI) which indicates data providing authorization. Then, the certificate generation part 220 sends the storing data (SDCI) with a certificate to the user apparatus 300.

The certificate verification part 230 acquires the data provider registration certificate (DPR) from the data registration apparatus 500 and verifies it.

The certificate verification part 330 acquires the data provider registration certificate (DPR) and the storing data with a certificate (SDCI) which is a digital signature of the data provider from the data providing apparatus 200. Then, the certificate verification part 330 verifies both of them. When they are verified, the certificate verification part 330 sends the storing data (APD) to the data verification part 340.

The data verification part 340 verifies the storing data (APD), and stored it into the memory 310 when it is verified.

The operation of the above-mentioned configuration will be described.

(1) The data registration apparatus 200 generates information (key information) used for providing certificate information (used in the certificate generation part 220) by using the key information generation part 250, and sends the information (PKD) (key information, or a part of the key information) to the data registration apparatus 500.

(2) The data registration apparatus 500 generates the data provider registration certificate (DPR) by using he information (PKD) in the certificate generation part 520. Then, the data registration apparatus 500 stores the information (PKD) and the data provider registration certificate (DPR) in the database 510, and sends and the data provider registration certificate (DPR) to the data providing apparatus 200.

The data providing apparatus 200 verifies the data provider registration certificate (DPR) in the certificate verification part 230. When it is verified, the data provider registration certificate (DPR) is stored in the database 210.

(Step 61) The user apparatus 300 sends the storing data information (SDI) on data to be stored to the data providing apparatus 200.

(Step 62, 63) The data providing apparatus 200 acquires necessary data information (APD) from the database 210 by using the received storing information. Then, the data providing apparatus 200 generates the storing data with a certificate (SDCI) which is on the storing data information (SDI) and the storing data (APD) and sends the storing data with the certificate (SDCI) and the data provider registration certificate (DPR) to the user apparatus 300.

The user apparatus 300 verifies the storing data with the certificate (SDCI) and the data provider registration certificate (DPR) in the certificate verification part 330. When both of them are verified, the storing data (APD) which is extracted from the storing data with the certificate (SDCI) is sent so the data verification part 340. Then, the data verification part 340 verifies that the storing data (APD) corresponds to the requested storing data information (SDI). When it is verified, the storing data (APD) is stored in the memory 310.

(Seventh Embodiment)

In the above-mentioned sixth embodiment, the data registration apparatus 500 may generate the storing data with the certificate (SDCI). In the following, the operation in this case will be described with reference to FIG. 15 as a seventh embodiment. The configuration shown in FIG. 15 does not includes the certificate generation part 220 and the key information generation part 250, instead, includes a storing data acquisition part 250.

First, the data providing apparatus 200 acquire the storing data (APD), which is stored by a user, from the database 210 by using the storing data information (SDI) as a key.

Next, the data providing apparatus 200 sends the storing data (APD) and information on the storing data (APD) (the storing data information (SDI), the size of the storing data (APD) or the like) to the data registration apparatus 500.

The data registration apparatus 500 generates a data certificate (SDCI) from the storing data (APD) and the information by using the certificate generation part 520, and stores the storing data (APD) and the data certificate (SDCI) in the database 510. Then, the data registration apparatus 500 sends the data certificate (SDCI) in the database 210.

The user apparatus 300 sends the storing data information (SDI), which is information on data to be stored, to the data providing apparatus 200.

The data providing apparatus 200 acquires data (SDCI) which includes the necessary storing data (APD), the data certificate (SDCI) and the information on the storing data (APD) from the database 210 by using the received storing data information (SDI), and sends the data (SDCI) to the user apparatus 300.

The user apparatus 300 verifies the data (SDCI) by using the certificate verification part 330. When the data (SDCI) is verified, the storing data extracted from the data (SDCI) is sent to the data verification part 340. The verification part 340 verifies that requested data corresponds to the extracted storing data (APD). When it is verified, the storing data (APD) is stored in the memory 310.

The above-mentioned embodiments is described on the basis of each element shown in each figure. In addition, each element in the user apparatus, the data providing apparatus, the data registration apparatus, the issuing apparatus and issuer registration apparatus can be constructed by a program. The program can be stored in a disk device which is connected to a computer which can be used as the user apparatus, the data providing apparatus, the data registration apparatus, the issuing apparatus or the issuer registration apparatus. In addition, the program can be stored in a transportable recording medium such as a floppy disk, CD-ROM and the like. By installing the program stored in these medium to a computer, the present invention can be realized.

Figure 15:
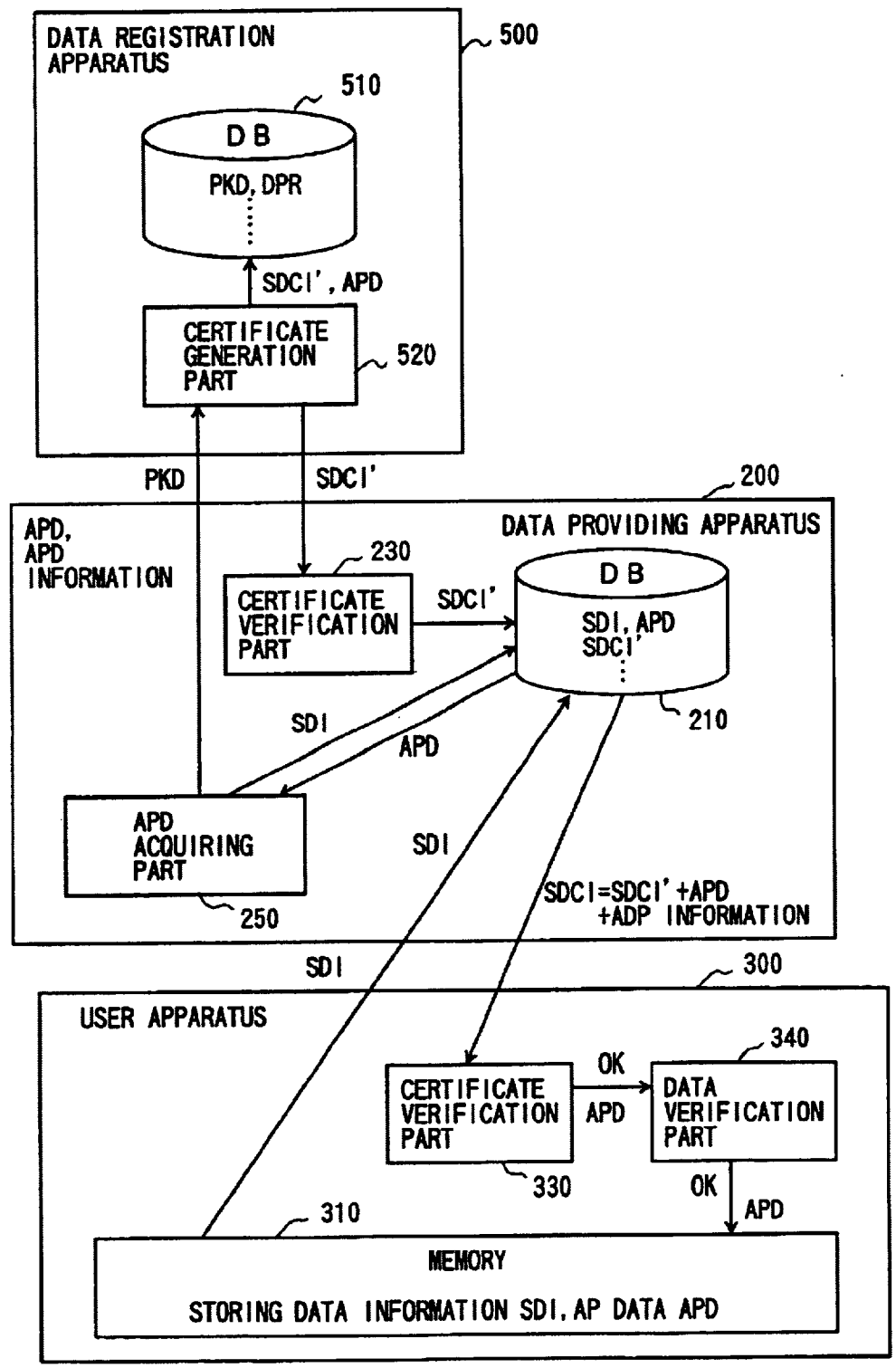
FIG. 15 is a block diagram of the data storing system when data is stored according to a seventh embodiment.
Figure 16:
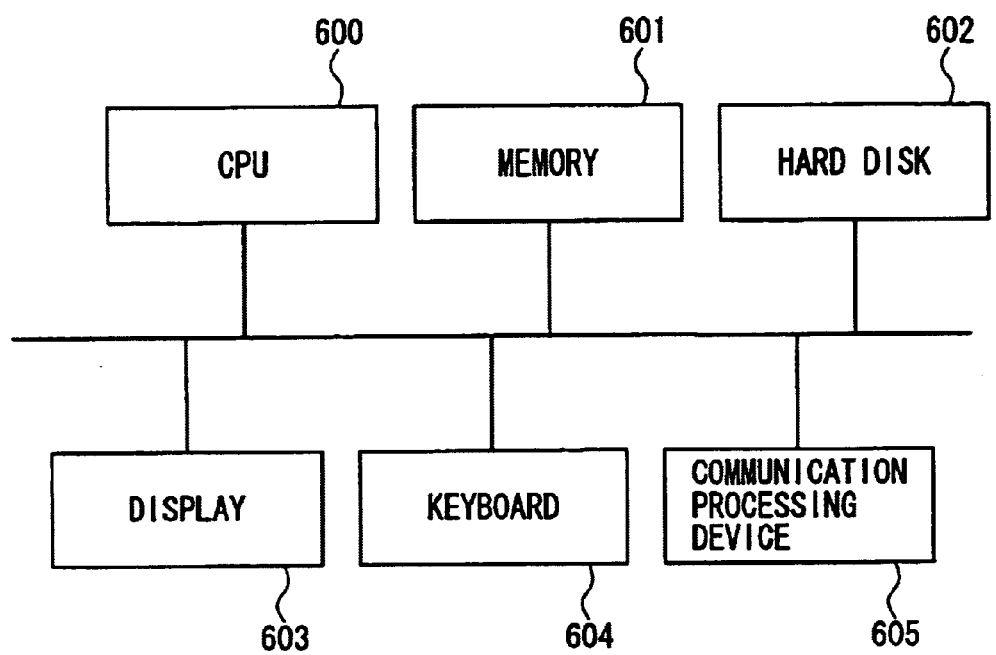

The computer system which can be used the issuing apparatus, the data providing apparatus and the like may be configured as shown in FIG. 15 for example. The computer system includes a CPU 600 which executes Processes, a memory 601 which stores programs and data, a hard disk 602 which stores programs and data used in the memory 601 or the CPU 600, a display 603 which displays data, a keyboard 604 for inputting data or commands and a communication processing apparatus 605 which performs communication with another computer via a network. By installing a program which executes processes of the issuing apparatus and the data providing apparatus and the like which are described in detail in each embodiment, the computer can be used as the issuing apparatus, the data providing apparatus and the like. The program is installed in the memory 601 or the hard disk 602, and executed by the CPU 600.

As mentioned above, according to the present invention, the following effects can be obtained.

(1) By the registration certificate which is issued by the registration issuer, the party which receives the registration is insured. In addition, both of the card issuer and the service provider can perform processes such as data storing and data deleting safely.

That is, since the public key information used for a certificate is certified by the registration issued by each registrar, the validity of the authorization is insured such that both of the card issuer and the service provider perform processes safely. In addition, since the issuer which is certified issues the registration certificate of a card, the validity of the card is insured.

(2) By mutual agreement between the user, the card issuer and the service provider, the card issuer and the service provider equally can store and delete data in a card safely.

That is, as mentioned above, since a party issues the storing authorization to another party which performs data download, data download is not performed only by one of the card issuer and the service provide without authorization by another party such that data can be stored and deleted safely.

(3) Each of the card issuer and the service provider can obtain information on data which is stored an IC card.

That is, since data download is performed after each of the user, the card issuer and the service provider reaches an agreement, each of the card issuer and the service provider can obtain information on an application and a card which stores the application.

In the future, as the number of applications which are downloaded in IC cards increases, it becomes important to obtain the abovementioned information.

In addition, according to the present invention, a service provider can store data to a card which is issued by any IC card issuer safely.

The present invention is not limited to the specifically disclosed embodiments, and variations and modifications may be made without departing from the scope of the invention.

What is claimed is:

1. A data storing system comprising:
a user apparatus which stores data;
an issuing apparatus which is held by an issuer and that provides the user apparatus;
a data providing apparatus which is held by a data provider that provides data;
an issuer registration apparatus which is held by an issuer registrar and that registers and manages the issuer; and
a data registration apparatus which is held by a data registrar that registers and manages the data provider;
wherein:
the issuer registration apparatus issues, to the issuing apparatus, an issuing apparatus registration certificate for certifying validity of the issuing apparatus,
the data registration apparatus issues, to the data providing apparatus, a data providing apparatus registration certificate for certifying validity of the data providing apparatus,
the issuing apparatus issues, to the user apparatus, a user apparatus registration certificate for certifying validity of the user apparatus,
the user apparatus sends a data download request with the user apparatus registration certificate and storing data information to the issuing apparatus,
the issuing apparatus verifies the user apparatus registration certificate and the storing data information which are received from the user apparatus, generates a storing authorization request by using the user apparatus registration certificate and the storing data information when the user apparatus registration certificate and the storing data information are verified, and sends the storing authorization request to the data providing apparatus,
the data providing apparatus verifies the storing authorization request received from the issuing apparatus, generates a storing authorization when the storing authorization request is verified, and sends the storing authorization to the issuing apparatus,
the issuing apparatus that receives the storing authorization from the data providing apparatus verifies the storing authorization, and sends the storing authorization to the user apparatus when the storing authorization is verified, and
the user apparatus that receives the storing authorization from the issuing apparatus verifies the storing authorization, and obtains storing data from the data providing apparatus or from the issuing apparatus and stores the storing data into a storage device when the storing authorization is verified.

2. The data storing system of claim 1, wherein:
the data providing apparatus sends key information to the data registration apparatus,
the data registration apparatus generates the data providing apparatus registration certificate by using the key information, and sends the data providing apparatus registration certificate to the data providing apparatus,
the data providing apparatus provides certificate information to the storing data to be stored in the user apparatus, and
when the user apparatus receives the data providing apparatus registration certificate and the storing data with the certificate information from the data providing apparatus, the user apparatus verifies the storing data by verifying the certificate information by using the data providing apparatus registration certificate.

3. The data storing system of claim 1, wherein:
the data providing apparatus sends the storing data to the data registration apparatus,
the data registration apparatus generates certificate information for the storing data, and sends the certificate information to the data providing apparatus, and
when the user apparatus receives the storing data with the certificate information from the data providing apparatus, the user apparatus verifies the storing data by verifying the certificate information.

4. The data storing system of claim 1, wherein, instead of obtaining and storing the storing data, the user apparatus deletes the storing data already stored in the storage device.

5. A data storing system comprising:
a user apparatus which stores data;
an issuing apparatus which is held by an issuer that provides the user apparatus;
a data providing apparatus which is held by a data provider that provides data;
an issuer registration apparatus which is held by an issuer registrar that registers and manages the issuer; and
a data registration apparatus which is held by a data registrar that registers and manages the data provider;
wherein:
the issuer registration apparatus issues, to the issuing apparatus, an issuing apparatus registration certificate for certifying validity of the issuing apparatus,
the data registration apparatus issues, to the data providing apparatus, a data providing apparatus registration certificate for certifying validity of the data providing apparatus,
the data issuing apparatus issues, to the user apparatus, a user apparatus registration certificate for certifying validity of the user apparatus,
the user apparatus sends a data download request with the user apparatus registration certificate and storing data information to the data providing apparatus,
the data providing apparatus verifies the user apparatus registration certificate and the storing data information which are received from the user apparatus, generates a storing authorization request by using the user apparatus registration certificate and the storing data information when the user apparatus registration certificate and the storing data information are verified, and sends the storing authorization request to the issuing apparatus,
the issuing apparatus verifies the storing authorization request received from the data providing apparatus, generates a storing authorization when the storing authorization request is verified, and sends the storing authorization to the data providing apparatus,
the data providing apparatus that receives the storing authorization from the issuing apparatus verifies the storing authorization, and sends the storing authorization to the user apparatus when the storing authorization is verified, and
the user apparatus that receives the storing authorization from the data providing apparatus verifies the storing authorization, and obtains storing data from the data providing apparatus or from the issuing apparatus and stores the storing data into a storage device when the storing authorization is verified.

6. The data storing system of claim 5, wherein, instead of obtaining and storing the storing data, the user apparatus deletes the storing data already stored in the storage device.

7. A data storing system comprising:
a user apparatus which stores data;
an issuing apparatus which is held by an issuer that provides the user apparatus;
a data providing apparatus which is held by a data provider that provides data;
an issuer registration apparatus which is held by an issuer registrar that registers and manages the issuer; and
a data registration apparatus which is held by a data registrar that registers and manages the data provider;
wherein:
the issuer registration apparatus issues, to the issuing apparatus, an issuing apparatus registration certificate for certifying validity of the issuing apparatus,
the data registration apparatus issues, to the data providing apparatus, a data providing apparatus registration certificate for certifying validity of the data providing apparatus,
the data issuing apparatus issues, to the user apparatus, a user apparatus registration certificate for certifying validity of the user apparatus,
the user apparatus sends a data download request with the user apparatus registration certificate and storing data information to the data providing apparatus,
the data providing apparatus verifies the user apparatus registration certificate and the storing data information which are received from the user apparatus, generates a storing authorization when the user apparatus registration certificate and the storing data information are verified, and sends the storing authorization to the user apparatus, and
the user apparatus that receives the storing authorization from the data providing apparatus verifies the storing authorization, and obtains storing data from the data providing apparatus and stores the storing data into a storage device when the storing authorization is verified.

8. The data storing system of claim 7, wherein, instead of obtaining and storing the storing data, the user apparatus deletes the storing data already stored in the storage device.

9. An issuing apparatus for use in a data storing system, the issuing apparatus comprising:
a part for issuing, to a user apparatus, a user apparatus registration certificate for certifying validity of the user apparatus, wherein the user apparatus sends a data download request with the user apparatus registration certificate and storing data information to the issuing apparatus;
a part for verifying the user apparatus registration certificate and the storing data information which are received from the user apparatus, generating a storing authorization request by using the user apparatus registration certificate and the storing data information when the user apparatus registration certificate and the storing data information are verified, and sending the storing authorization request to the data providing apparatus,
wherein a data providing apparatus verifies the storing authorization request received from the issuing apparatus, and generates a storing authorization when the storing authorization request is verified, and sends the storing authorization to the issuing apparatus, and
a part for receiving the storing authorization from the data providing apparatus, and verifying the storing authorization, and sending the storing authorization to the user apparatus when the storing authorization is verified,
wherein the user apparatus that receives the storing authorization from the issuing apparatus verifies the storing authorization, and obtains storing data from the data providing apparatus or from the issuing apparatus and stores the storing data into a storage device when the storing authorization is verified;
wherein the data storing system includes:
the user apparatus which stores data, the issuing apparatus being held by an issuer that provides the user apparatus,
the data providing apparatus which is held by a data provider that provides data,
an issuer registration apparatus which is held by an issuer registrar that registers and manages the issuer, and the data registration apparatus which is held by a data registrar that registers and manages the data provider, wherein:

the issuer registration apparatus issues, to the issuing apparatus, an issuing apparatus registration certificate for certifying validity of the issuing apparatus, the data registration apparatus issues, to the data providing apparatus, a data providing apparatus registration certificate for certifying validity of the data providing apparatus.

10. A data providing apparatus for use in a data storing system, the data providing apparatus comprising:

a part for receiving a data download request with a user apparatus registration certificate and storing data information from a user apparatus;

a part for verifying the user apparatus registration certificate and the storing data information which are received from the user apparatus, generating a storing authorization request by using the user apparatus registration certificate and the storing data information when the user apparatus registration certificate and the storing data information are verified, and sending the storing authorization request to the issuing apparatus, wherein the issuing apparatus verifies the storing authorization request received from the data providing apparatus, generates a storing authorization when the storing authorization request is verified, and sends the storing authorization to the data providing apparatus, and a part for receiving the storing authorization from an issuing apparatus verifies the storing authorization, and sending the storing authorization to the user apparatus when the storing authorization is verified, wherein the user apparatus that receives the storing authorization from the data providing apparatus verifies the storing authorization, and obtains storing data from the data providing apparatus or from the issuing apparatus and stores the storing data into a storage device when the storing authorization is verified;

wherein the data storing system includes:

the user apparatus which stores data, the issuing apparatus which is held by an issuer that provides the user apparatus, the data providing apparatus which is held by a data provider that provides data, an issuer registration apparatus which is held by an issuer registrar that registers and manages the issuer, and a data registration apparatus which is held by a data registrar that registers and manages the data provider, wherein:

the issuer registration apparatus issues, to the issuing apparatus, an issuing apparatus registration certificate for certifying validity of the issuing apparatus, the data registration apparatus issues, to the data providing apparatus, a data providing apparatus registration certificate for certifying validity of the data providing apparatus, and the data issuing apparatus issues, to the user apparatus, a user apparatus registration certificate for certifying validity of the user apparatus.

11. A data providing apparatus for use in a data storing system, the data providing apparatus comprising:

a part for receiving a data download request with a user apparatus registration certificate and storing data information from a user apparatus; and a part for verifying the user apparatus registration certificate and the storing data information which are received from the user apparatus, generating a storing authorization when the user apparatus registration certificate and the storing data information are verified, and sending the storing authorization to the user apparatus, wherein the user apparatus that receives the storing authorization from the data providing apparatus verifies the storing authorization, and obtains storing data from the data providing apparatus and stores the storing data into a storage device when the storing authorization is verified;

wherein the data storing system includes:

the user apparatus which stores data, an issuing apparatus which is held by an issuer that provides the user apparatus, the data providing apparatus which is held by a data provider that provides data, an issuer registration apparatus which is held by an issuer registrar that registers and manage the issuer, and a data registration apparatus which is held by a data registrar that registers and manages the data provider, wherein:

the issuer registration apparatus issues, to the issuing apparatus, an issuing apparatus registration certificate for certifying validity of the issuing apparatus, the data registration apparatus issues, to the data providing apparatus, a data providing apparatus registration certificate for certifying validity of the data providing apparatus, and the data issuing apparatus issues, to the user apparatus, a user apparatus registration certificate for certifying validity of the user apparatus.

12. A computer readable medium storing program code for causing an issuing apparatus for use in a data storing system to perform processes, the computer readable medium comprising:

program code means for issuing, to a user apparatus, a user apparatus registration certificate for certifying validity of the user apparatus, wherein the user apparatus sends a data download request with the user apparatus registration certificate and storing data information to the issuing apparatus;

program code means for verifying the user apparatus registration certificate and the storing data information which are received from the user apparatus, generating a storing authorization request by using the user apparatus registration certificate and the storing data information when the user apparatus registration certificate and the storing data information are verified, and sending the storing authorization request to the data providing apparatus, wherein the data providing apparatus verifies the storing authorization request received from the issuing apparatus, and generates a storing authorization when the storing authorization request is verified, and sends the storing authorization to the issuing apparatus; and program code means for receiving the storing authorization from the data providing apparatus, and verifying the storing authorization, and sending the storing authorization to the user apparatus when the storing authorization is verified,
wherein the user apparatus that receives the storing authorization from the issuing apparatus verifies the storing authorization, and obtains storing data from the data providing apparatus or from the issuing apparatus and stores the storing data into a storage device when the storing authorization is verified;

wherein the data storing system includes:
the user apparatus which stores data,
the issuing apparatus which is held by an issuer that provides the user apparatus,
a data providing apparatus which is held by a data provider that provides data,
an issuer registration apparatus which is held by an issuer registrar that registers and manages the issuer, and
a data registration apparatus which is held by a data registrar that registers and manages the data provider,
wherein:
the issuer registration apparatus issues, to the issuing apparatus, an issuing apparatus registration certificate for certifying validity of the issuing apparatus, and
the data registration apparatus issues, to the data providing apparatus, a data providing apparatus registration certificate for certifying validity of the data providing apparatus.

13. A computer readable medium storing program code for causing a data providing apparatus used in a data storing system to perform processes, the computer readable medium comprising:
program code means for receiving a data download request with a user apparatus registration certificate and storing data information from a user apparatus;
program code means for verifying the user apparatus registration certificate and the storing data information which are received from the user apparatus, generating a storing authorization request by using the user apparatus registration certificate and the storing data information when the user apparatus registration certificate and the storing data information are verified, and sending the storing authorization request to the issuing apparatus,
wherein an issuing apparatus verifies the storing authorization request received from the data providing apparatus, generates a storing authorization when the storing authorization request is verified, and sends the storing authorization to the data providing apparatus; and
program code means for receiving the storing authorization from the issuing apparatus verifies the storing authorization, and sending the storing authorization to the user apparatus when the storing authorization is verified,
wherein the user apparatus that receives the storing authorization from the data providing apparatus verifies the storing authorization, and obtains storing data from the data providing apparatus or from the issuing apparatus and stores the storing data into a storage device when the storing authorization is verified;

wherein the data storing system includes:
the user apparatus which stores data,
the issuing apparatus which is held by an issuer that provides the user apparatus,
the data providing apparatus which is held by a data provider that provides data,
an issuer registration apparatus which is held by an issuer registrar that registers and manages the issuer, and
a data registration apparatus which is held by a data registrar that registers and manages the data provider,
wherein:
the issuer registration apparatus issues, to the issuing apparatus, an issuing apparatus registration certificate for certifying validity of the issuing apparatus,
the data registration apparatus issues, to the data providing apparatus, a data providing apparatus registration certificate for certifying validity of the data providing apparatus, and
the data issuing apparatus issues, to the user apparatus, a user apparatus registration certificate for certifying validity of the user apparatus.

14. A computer readable medium storing program code for causing a data providing apparatus used in a data storing system to perform processes, the computer readable medium comprising:
program code means for receiving a data download request with a user apparatus registration certificate and storing data information from a user apparatus; and
program code means for verifying the user apparatus registration certificate and the storing data information which are received from the user apparatus, generating a storing authorization when the user apparatus registration certificate and the storing data information are verified, and sending the storing authorization to the user apparatus,
wherein the user apparatus that receives the storing authorization from the data providing apparatus verifies the storing authorization, and obtains storing data from the data providing apparatus and stores the storing data into a storage device when the storing authorization is verified;

wherein the data storing system includes:
the user apparatus which stores data,
an issuing apparatus which is held by an issuer that provides the user apparatus,
the data providing apparatus which is held by a data provider that provides data,
an issuer registration apparatus which is held by an issuer registrar that registers and manages the issuer, and
a data registration apparatus which is held by a data registrar that registers and manages the data provider,
wherein:
the issuer registration apparatus issues, to the issuing apparatus, an issuing apparatus registration certificate for certifying validity of the issuing apparatus,
the data registration apparatus issues, to the data providing apparatus, a data providing apparatus registration certificate for certifying validity of the data providing apparatus, and
the data issuing apparatus issues, to the user apparatus, a user apparatus registration certificate for certifying validity of the user apparatus.

* * * * *

UNITED STATES PATENT AND TRADEMARK OFFICE
CERTIFICATE OF CORRECTION

PATENT NO. : 7,058,804 B1
APPLICATION NO. : 09/650323
DATED : July 11, 2006
INVENTOR(S) : Kazuo Aoyama et al.

It is certified that error appears in the above-identified patent and that said Letters Patent is hereby corrected as shown below:

On title page, item [56]: at OTHER PUBLICATIONS, line 1, change "Contermporary" to --Contemporary--;

Column 1, line 29, change "Therefor" to --Therefore--;

Column 4, line 10, change "comprises:" to --comprise:--;

Column 4, line 61, change "registration," to --registration--;

Column 5, line 52, change "in a,storage" to --in a storage--;

Column 13, line 37, change "may generates" to --may generate--;

Column 14, line 27, change "Tie" to --The--;

Column 15, line 53, change "he" to --the--;

Column 16, line 22, change "includes" to --include-- and

Column 16, line 54, change "embodiments is" to --embodiments are--.

Signed and Sealed this

Thirtieth Day of January, 2007

JON W. DUDAS
*Director of the United States Patent and Trademark Office*

UNITED STATES PATENT AND TRADEMARK OFFICE
CERTIFICATE OF CORRECTION

PATENT NO.         : 7,058,804 B1
APPLICATION NO. : 09/650323
DATED                 : June 6, 2006
INVENTOR(S)       : Hideki Akashika It is certified that error appears in the above-identified patent and that said Letters Patent is hereby corrected as shown below:

On title page, item [56]: at OTHER PUBLICATIONS, line 1, change "Contermporary" to --Contemporary--;

Column 1, line 29, change "Therefor" to --Therefore--;

Column 4, line 10, change "comprises:" to --comprise:--;

Column 4, line 61, change "registration," to --registration--;

Column 5, line 52, change "in a,storage" to --in a storage--;

Column 13, line 37, change "may generates" to --may generate--;

Column 14, line 27, change "Tie" to --The--;

Column 15, line 53, change "he" to --the--;

Column 16, line 22, change "includes" to --include-- and

Column 16, line 54, change "embodiments is" to --embodiments are--.

This certificate supersedes Certificate of Correction issued January 30, 2007.

Signed and Sealed this

Twenty-seventh Day of February, 2007

JON W. DUDAS
*Director of the United States Patent and Trademark Office*